(12) United States Patent
Kim et al.

(10) Patent No.: US 7,742,782 B2
(45) Date of Patent: *Jun. 22, 2010

(54) DEVICE AND METHOD FOR PROCESSING SYSTEM-RELATED EVENTS IN A PORTABLE TERMINAL

(75) Inventors: Jae-Ho Kim, Gumi-si (KR); Hyun-Ji Kim, Daegu (KR); Jeong-Wook Seo, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 575 days.

This patent is subject to a terminal disclaimer.

(21) Appl. No.: 11/311,358

(22) Filed: Dec. 20, 2005

(65) Prior Publication Data

US 2006/0166708 A1    Jul. 27, 2006

(30) Foreign Application Priority Data

Dec. 20, 2004 (KR) ................. 10-2004-0108751
Dec. 5, 2005 (KR) ................. 10-2005-0117726

(51) Int. Cl.
*H04M 1/00* (2006.01)

(52) U.S. Cl. ............... 455/550.1; 455/414.1; 455/418; 370/328

(58) Field of Classification Search ........... 455/414.1, 455/418, 550.1; 370/328
See application file for complete search history.

(56) References Cited

U.S. PATENT DOCUMENTS

| 6,088,731 | A | 7/2000 | Kirali |
| 6,405,062 | B1 | 6/2002 | Izaki |
| 7,401,296 | B2 | 7/2008 | Watanabe et al. |
| 2003/0087665 | A1* | 5/2003 | Tokkonen ............. 455/556 |
| 2004/0235531 | A1* | 11/2004 | Anzawa et al. ............. 455/563 |
| 2005/0075069 | A1* | 4/2005 | Higuchi ............. 455/3.05 |
| 2005/0075097 | A1* | 4/2005 | Lehikoinen et al. ......... 455/414.1 |
| 2005/0130631 | A1* | 6/2005 | Maguire et al. ........... 455/414.1 |

(Continued)

FOREIGN PATENT DOCUMENTS

CN    1472670 A    2/2004

(Continued)

OTHER PUBLICATIONS

Muller et al., "Face-to-Face with your assistant. Realization issues of animated user interface agents for home appliances" Computers and Graphics, Pergamon Press Ltd. Oxford, GB, vol. 25, No. 4, Aug. 2001 pp. 593-600, XP004296036.

(Continued)

*Primary Examiner*—Danh C Le
(74) *Attorney, Agent, or Firm*—Roylance, Abrams, Berdo & Goodman, L.L.P.

(57) ABSTRACT

Provided is a device and a method for processing system-related events generated in a portable terminal. The method includes the steps of storing system-related events generated in the portable terminal, confirming specialists set in advance so that the system-related events can be processed by the specialists respectively, calling the confirmed specialists and processing the system-related events, and displaying the processing results set in advance with respect to the specialists with a text/avatar, according to the processing results which are processed by the specialists.

31 Claims, 23 Drawing Sheets

U.S. PATENT DOCUMENTS

2005/0159125 A1 * 7/2005 Lodolo et al. ............ 455/226.4

FOREIGN PATENT DOCUMENTS

EP 1 309 158 5/2003
EP 1 387 241 2/2004

OTHER PUBLICATIONS

Luke Schwartz, "Why people hate the paperclip: labels, appearance, behaviour and social responses to user interface agency" Thesis, XX, XX, Jun. 12, 2003, page complete, XP002372788, pp. 1-11.

"Method for Notifying Caller of Speed Dial Settings", IBM Technical Disclosure Bulletin, IBM Corp. New York, US, vol. 36, No. 9B, Sep. 1, 1993, pp. 21-22, XP000397053, ISSN: 0018-8689.

* cited by examiner

DEVICE AND METHOD FOR PROCESSING SYSTEM-RELATED EVENTS IN A PORTABLE TERMINAL

CROSS-REFERENCE TO RELATED PATENT APPLICATIONS

This application claims the benefit under 35 U.S.C. §119 (a) of Korean Patent Application No. 2004-108751, filed Dec. 20, 2004, and Korean Patent Application No. 2005-117726, filed Dec. 5, 2005, in the Korean Intellectual Property Office, the entire contents of both of which are hereby incorporated by reference.

BACKGROUND OF THE INVENTION

1. Field of the Invention

The present invention relates to a device and a method for processing system-related events in a portable terminal. More particularly, the present invention relates to a device and a method for processing system-related events generated in a portable terminal.

2. Description of the Related Art

In general, a portable terminal refers to a device which a user can carry. An exemplary portable terminal is a mobile phone. Recently, mobile phones have been developed that provides additional functions in addition to the original phone function. Exemplary mobile phones having additional functions include a camcorder phone having a camera module, a TV phone on which TV can be watched, an MP3 phone by which MP3 (MPEG 3) music files can be listened, a DMB phone by which satellite broadcasts and/or terrestrial broadcasts can be watched. The trend in mobile phone development is to have additional functions capable of processing multimedia data.

Portable terminals having various additional functions generally include a LCD (Liquid Crystal Display) unit. Further, there is a trend in mobile phone development to have various display methods displaying the various functions and states of the portable terminal so that they can be more easily recognized. Accordingly, portable terminals have been developed that are capable of displaying various kinds of user data. The types of user data currently displayed in portable terminals mainly include visible user data such as a picture data, a character, an animation, or the like. Further, there is a trend in which avatar image data is being used more often in the portable terminals.

Accordingly, there is a need for an improved device and a method for processing system-related events generated in a portable terminal.

SUMMARY OF THE INVENTION

An aspect of the present invention is to address at least the above problems and/or disadvantages and to provide at least the advantages described below. Accordingly, an aspect of the present invention is to provide a device and a method for processing system-related events generated in a portable terminal.

It is another aspect of the present invention to provide a device and a method for processing system-related events in a portable terminal, in which a character UI (User Interface) including the most suitable specialist, which requests a user to perform a corresponding operation according to the kind of the system-related event by analyzing the system-related events, can be selected and expressed.

It is still another aspect of the present invention to provide a device and a method for processing system-related events in a portable terminal, in which a character UI can be selected and expressed to show the system-related event generated in the portable terminal under the control of a control unit of the portable terminal.

In order to accomplish these aspects, there is provided a device for processing system-related events in a portable terminal, the device comprising a memory for storing a character UI image according to a system-related event; an event collection section for detecting the system-related event generated in the portable terminal and for generating an event message for discriminating the generated system-related event; an agent control section comprising a plurality of specialists for the system-related events, the agent control section determining a specialist of the plurality of specialists, which corresponds to the event message, and selecting and outputting a character UI Identification (ID), which corresponds to the system-related event of the determined specialist; and an agent expression section for accessing and outputting at least one of a character image and a text corresponding to the character UI ID according to the system-related event.

According to another aspect of the present invention, there is provided a method for processing system-related events in a portable terminal, the method comprising the steps of storing system-related events generated in the portable terminal; confirming specialists set in advance, so that the system-related events can be processed by the specialists, respectively; calling the confirmed specialists and processing the system-related events; and displaying the processing results set in advance with respect to the specialists with a text/avatar, according to the processing results which are processed by the specialists.

According to another aspect of the present invention, there is provided a method for processing system-related events in a portable terminal, the method comprising the steps of checking a battery state of the portable terminal; displaying a text/avatar informing a user that the battery of the portable terminal is fully charged if the battery of the portable terminal is fully charged; and displaying a text/avatar informing a user that the residual amount of the battery is low if the residual amount of the battery is less than a threshold value.

According to another aspect of the present invention, there is provided a method for processing system-related events in a portable terminal, the method comprising the steps of checking a signal state of the portable terminal; and displaying a text/avatar informing a user that a signal received by the portable terminal is weak if the intensity of a signal received by the portable terminal is less than a threshold value.

According to another aspect of the present invention, there is provided a method for processing system-related events in a portable terminal, the method comprising the steps of checking an available memory capacity of the portable terminal; and displaying a text/avatar informing a user that the available memory, capacity of the portable terminal is low if the available memory capacity of the portable terminal is less than a threshold value.

According to another aspect of the present invention, there is provided a method for processing system-related events in a portable terminal, the method comprising the steps of checking a bell sound changing day by a threshold period; and displaying a text/avatar recommending a change of the bell sound if the bell sound changing day exceeds a threshold day.

According to another aspect of the present invention, there is provided a method for processing system-related events in a portable terminal, the method comprising the steps of: checking a background changing day by a threshold period;

and displaying a text/avatar recommending a change of the background if the background changing day exceeds a threshold day.

According to another aspect of the present invention, there is provided a method for processing system-related events in a portable terminal, the method comprising the steps of determining whether a bell mode change has been performed at more than a threshold number of times within a threshold time range, if the bell mode change is performed in the portable terminal; setting a bell mode changing timer, if the bell mode change has been performed at more than a threshold number of times within a threshold time range; determining whether the bell mode change is performed within the threshold time range, if the bell mode changing timer is set; and displaying a text/avatar recommending change of the bell mode, if the bell mode change is performed within the threshold time range.

According to another aspect of the present invention, there is provided a method for processing system-related events in a portable terminal, the method comprising the steps of checking the phone use frequency by a threshold period in the portable terminal; and displaying a text/avatar recommending use of a corresponding recommended program, if the phone use frequency is lower than a threshold value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
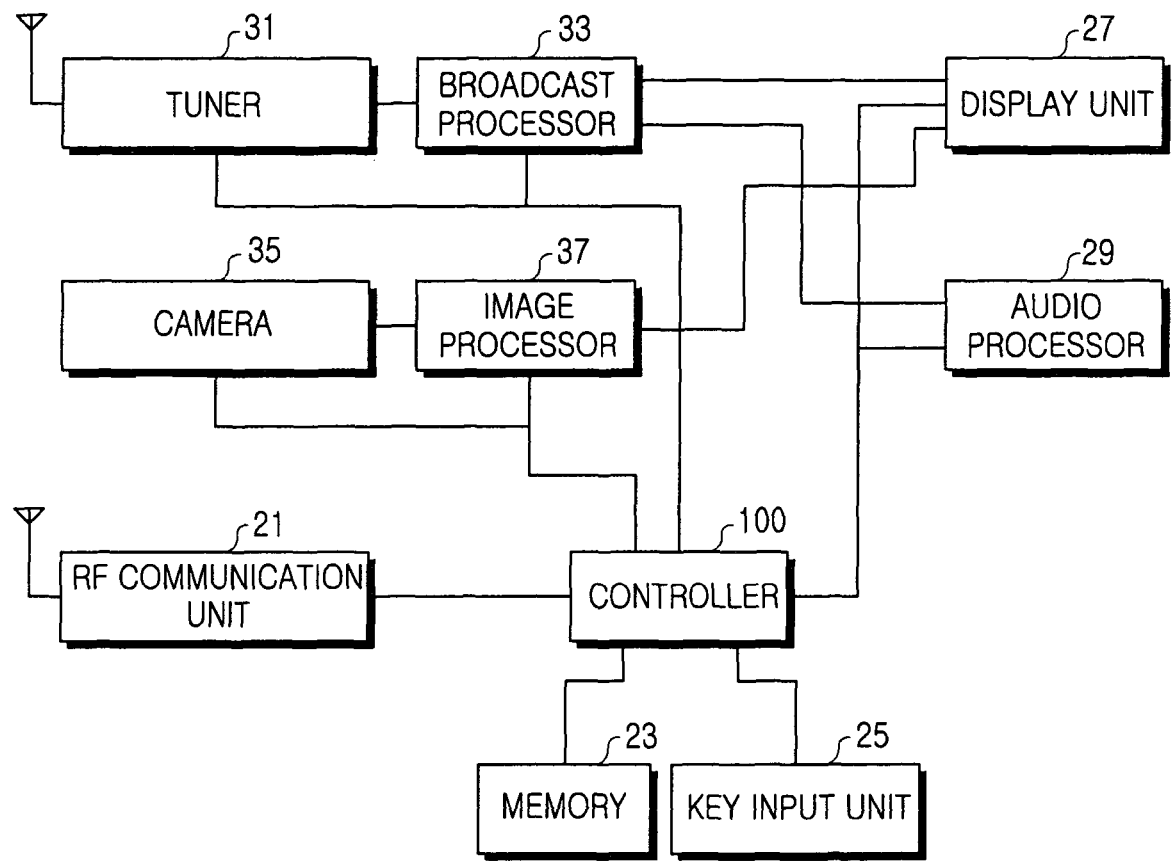
FIG. 1 is a block diagram of a portable terminal according to an exemplary embodiment of the present invention.

Hereinafter, an exemplary embodiment of the present invention will be described with reference to the accompanying drawings. It should be noted that, in the drawings, the same elements are endowed with the same reference numerals. Further, in the following description, predetermined details such as the kinds of events, examples of information required for expressing the agents, etc. are represented for better understanding of the exemplary embodiments of the present invention. However, it will be apparent to those skilled in the art that the present invention can be easily performed without using the predetermined details or by deformation of the details.

FIG. 1 is a block diagram for a portable terminal representing character agents of events generated in the portable terminal, according to an exemplary embodiment of the present invention. Referring to FIG. 1, an RF communication unit 21 performs a radio communication function for the portable terminal. The RF communication unit 21 includes an RF transmitter for up-mixing and amplifying signals for transmission and an RF receiver for amplifying received signals to have low noise and down-mixing. A key input unit 25 includes keys for inputting number and letter information and function keys for setting various functions. The key input unit 25 also includes keys for controlling character agents of events according to an exemplary embodiment of the present invention.

A memory 23 can include a program memory and a data memory. The program memory stores programs for processing signals of the portable terminal and programs for controlling expression of the agents with respect to the events generated, according to the exemplary embodiment of the present invention. The data memory temporarily stores data generated while performing the operations of the portable terminal. The data memory includes a character memory for storing character images for the agent expressions. The character memory can be operated using a file system, and can have indices of the memory (or file system) according to the characters. The character memory can be of various types, in which the operations and expressions of the characters, the expressions of objects, or the like, which are the detailed elements of the characters, can be shown. In other words, the character information, which is stored in the character memory, can be stored in various types in which the agents can be expressed.

A control unit 100 controls the overall operations of the portable terminal. The control unit 100 includes a modem which modulates and demodulates signals, and a codec which encodes and decodes signals, so that it can encode and modulate signals for transmission, and demodulates and decodes received signals. The control unit 100 may be an MMS (mobile station modem) chip. The control unit 100 controls the operation of the portable terminal, in a communication mode, a camera mode, and a broadcasting reception mode, according to a mode selection by a user. The control unit 100 may be a data processing section in which a modem and a codec are separated from each other. The data processing section is located between the control unit 100 and the RF communication unit 21.

The control unit 100 may include an agent function section which can process system-related events, according to the exemplary embodiment of the present invention. The agent function section collects system-related events according to the operation of the portable terminal, and controls the agents according to the collected system-related events, thereby visually expressing the process and state of the system-related events by using the agents. Further, the agent function section can display the expression of the events, by selecting corresponding characters from the memory 23. The agent function section may be included in the control unit 100 or be provided separately. The agent function section will be described in detail in FIG. 2.

The control unit 100 can perform the operation of the agent function section, according to the exemplary embodiment of the present invention. In other words, the control unit 100 checks the state of a battery of the portable terminal, according to the exemplary embodiment of the present invention. After the check, if the battery is fully charged, the control unit 100 controls the portable terminal to display a text/avatar informing a user that the battery is currently in a fully charged state. Further, if the amount of the battery power is less than a predetermined threshold value, the control unit 100 controls the portable terminal to display a text/avatar informing the user that the current residual amount of the battery power is low. Further, the control unit 100 checks the intensity of a signal received by the portable terminal, according to the exemplary embodiment of the present invention. After the check, if the intensity of a signal received by the portable terminal is less than a predetermined threshold value, the control unit 100 controls the portable terminal to display a text/avatar informing a user that the current signal received by the portable terminal is weak. Further, the control unit 100 checks the memory capacity of the portable terminal, according to the exemplary embodiment of the present invention. After the check, if the available memory capacity is less than a predetermined threshold value, the control unit 100 controls the portable terminal to display a text/avatar informing a user that the current available capacity of the memory is small. Further, the control unit 100 checks the bell sound changing day of the portable terminal after a predetermined period, according to the exemplary embodiment of the present invention. If the bell sound changing day exceeds a predetermined threshold day, the control unit 100 controls the portable terminal to display a text/avatar recommending a change of the bell sound. Further, the control unit 100 checks the background changing day of the portable terminal after a predetermined period, according to the exemplary embodiment of the present invention. If the background changing day exceeds a predetermined threshold day, the control unit 100 controls the portable terminal to display a text/avatar recommending a change of the background. Further, if the bell sound is not changed within a predetermined time range within which the bell sound is changed according to the exemplary embodiment of the present invention, the control unit 100 can control the portable terminal to display a text/avatar recommending a change of the bell mode. Further, the control unit 100 checks the use frequency of the portable terminal, according to the exemplary embodiment of the present invention. After the check, if the use frequency of the portable terminal is less than a predetermined threshold value, the control unit controlling the portable terminal to display a text/avatar recommending use of a corresponding recommendation program.

A camera module 35 is driven by the control unit 100 if a user selects the camera mode, and photographs a subject and generates photographed image signals. After scaling the image signals photographed by the camera module 35 to the size of a display unit 27, an image processing unit 37 has the image signals displayed by the display unit 27. In a storing mode, the image processing unit 37 encodes and stores the photographed signals in a predetermined manner. Further, in a mode in which the received or stored image data is reproduced, the image processing unit 37 decodes the encoded image data.

A tuner 31 receives broadcast signals of a channel set under the control of the control unit 100 in a broadcast reception mode. A broadcast processing unit 33 demodulates and decodes the broadcast signals received by the tuner 31, and outputs image and audio signals to the display unit 27 and the audio processing unit 29, respectively. Here, the broadcast signals may be satellite broadcast signals or terrestrial broadcast signals.

The display unit 27 can display menus according to the operation of the portable terminal, under the control of control unit 100, and displays a character corresponding to an event when the event is generated. Further, the display unit displays image signals outputted from the image processing unit 37 or the broadcast processing unit 33 in a camera mode or a broadcast reception mode, respectively.

The audio processing unit 29 processes the audio signals generated in a communication mode under the control of control unit 100 in the communication mode, processes the audio signals generated in the camera mode while using the camera module to photograph under the control of image processing unit 100, and processes the broadcast audio signals received in the broadcast reception mode under the control of the broadcast processing unit 33.

In the above-mentioned portable terminal, the elements for processing the camera and/or broadcast signals can be omitted. However, even in this case, the character agent function with respect to the system-related events can be performed, according to the exemplary embodiment of the present invention. Hereinafter, characters are assumed to be avatars. Therefore, in the exemplary embodiment of the present invention, character agent control with respect to the system-related events of the portable terminal, will be described as avatar agent control. However, all the images except for avatars can be applied identically.

Figure 2:
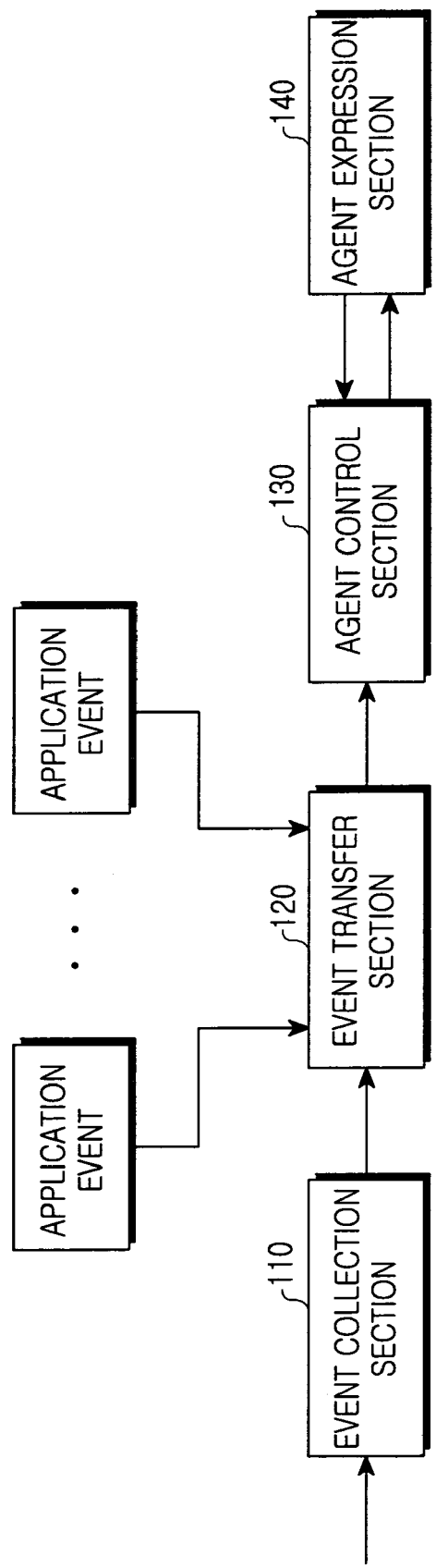
FIG. 2 is a block diagram of an agent function section of a portable terminal according to an exemplary embodiment of the present invention.

FIG. 2 is a block diagram of the agent function section according to the exemplary embodiment of the present invention.

Referring to FIG. 2, first, an event collection section 110 collects system-related events generated in the portable terminal. Here, the events may include all events which can be generated in the portable terminal, such as communication events of the portable terminal, events generated in the portable terminal itself, events generated by a request of a user, events related to performance of multimedia function of the portable terminal, or the like. In other words, the system-related events collected by the event collection section 110 become events defined by the portable terminal. The event collection section 110 generates event messages as information for discriminating the system-related events, and provides the event messages to an event transfer section 120.

The event transfer section 120 transfers the event messages provided by the event collection section 110 to clients. In the following description, although it is explained that the event transfer section 120 transfers the event messages only to an agent control section 130, the event messages can be transferred to another element requiring the transfer of the event messages.

In the event that messages are transferred from the event transfer section 120 to the agent control section 130, the transferred event messages are stored in an inner buffer and a UI (User Interface) is determined so that character agents corresponding to the event messages can be expressed. The event messages transferred, from the event transfer section 120 can be any of the events of the portable terminal, such as the system-related events collected by the events collection section 110. In the following description, the agent expression of the system-related events collected by the event collection section 110 will be described. The agent control section 130 includes a plurality of specialists therein. The agent control section 130 controls the specialists and selects a specialist corresponding to the generated system-related event, thereby performing an agent control function. If system-related events are received, the agent control section 130 informs suitable specialists of the generation of the events according to the received system-related events, and requests an agent expression section an UI, so that the agent expression of the selected specialist is displayed. Further, feedback information from a user with respect to the corresponding system-related event is processed according to the feedback information from the user, which is received by the agent expression section 140.

The agent expression section 140 displays expressions of a character with respect to a corresponding event, such as a system-related event, according to the agent UI information outputted from the agent control section 130. Then, the agent expression section 140 manages a plurality of avatar UIs, which are to be displayed in the display unit 27, and controls the portable terminal to display the avatar corresponding according to the UI information requested by the agent control section 130. If a user generates feedback information in the state in which the avatar is displayed according to the generated system-related event, the agent expression section 140 transfers the received feedback information to the agent control section 130. The agent control section 130 performs the agent control according to the feedback information received from the agent expression section 140.

For the agent function section shown in FIG. 2, if only system-related events of the portable terminal are collected in the event collection section 110, the event transfer section 120 can be omitted. Here, an inner buffer of the agent control section 130 is referred to as a blackboard.

The agent control section 130 will be described below in detail. The agent control section 130 includes a plurality of specialists which are called according to the kinds of system-related events and, after a predetermined special work is performed, outputs a result. The agent control section 130 further includes a blackboard for storing information including the information of the event messages, a supervision section which, in the case in which a plurality of specialists output valid results, selects one specialist among them. Additionally, the agent control section 130 includes an avatar value storing section for storing the values of avatars according to the generated system-related events, a specialist management section which, when system-related events are generated, selects the corresponding specialists from a specialist list according to the events and controls, the agents according to the system-related events.

The specialists contribute to solving problems. The specialists have specialties on restricted fields, and both record solutions in middle steps and expresses priorities and user preferences on the solutions in the middle steps. The specialists grasp the states of the blackboard and request the calculation of the priorities and user preferences, and records the solutions in the middle steps in the blackboard.

The blackboard is a working environment or an information space in which the specialists communicate with each other. Basically, the specialists record the solutions in the middle steps. The advantages of the blackboard pattern are as follows. First, the blackboard pattern allows several specialists of different kinds to be easily integrated. Second, since the specialists have little influence on each other, they can be developed so as to be independent modules. Third, the specialists are elastic to various changes, such as algorithm changes of the specialists, addition of new specialists, or the like.

If more than two specialists are selected with respect to one event, the specialist management section requests the supervision section to select a specialist that is most relevant to the received event. Then, the supervision section analyzes the data of the black board, the priorities and user preferences according to the events, and selects the most relevant specialist.

Then, the inner values of an avatar are changed by various events generated from the portable terminal, the agent function, and the feedback of the user. In addition, the various application events capable of using the avatar values also influence the avatar values. As the inner values of the avatar are changed, avatar interfaces are also changed and the avatar grows, which is the concept of avatar growth. The portable terminal according to the exemplary embodiment of the present invention introduces the rearing of avatar, on the basis of an artificial intelligence agent system. The exemplary embodiment of the present invention allows a user to use the portable terminal more effectively, by suggesting various actions to the user according to various events generated in the portable terminal. Further, the values of an avatar are changed according to the events and the feedback actions of a user.

The following Table 1 represents the kinds of system-related events in the portable terminal according to the exemplary embodiment of the present invention. In Table 1, use cases of system-related events, classification of system-related events, determination points of system-related events, action (processing) points of system-related events, parameters (required information) of system-related events, frequencies, illustration of conditions, UI texts, selection items of a user, or the like are arranged and displayed. Other system-related events can be added to or deleted from the above-mentioned system-related, events.

embodiments of the present invention will be described in detail with reference to FIGS. 3 to 24. FIGS. 3, 5, 7, 9, 11, 13, 14, and 16 describe the system-related event processing operations under the control of the agent function section. FIGS. 4, 6, 8, 10, 12, 15, and 17 describe the system-related event processing operations under the control of the control unit 100 in the case in which the agent function section is provided separately from the control unit 100 or is not provided in the portable terminal. Further, FIGS. 18 to 24 are views for explaining the operations of FIGS. 3 to 17 with an avatar.

Figure 3:
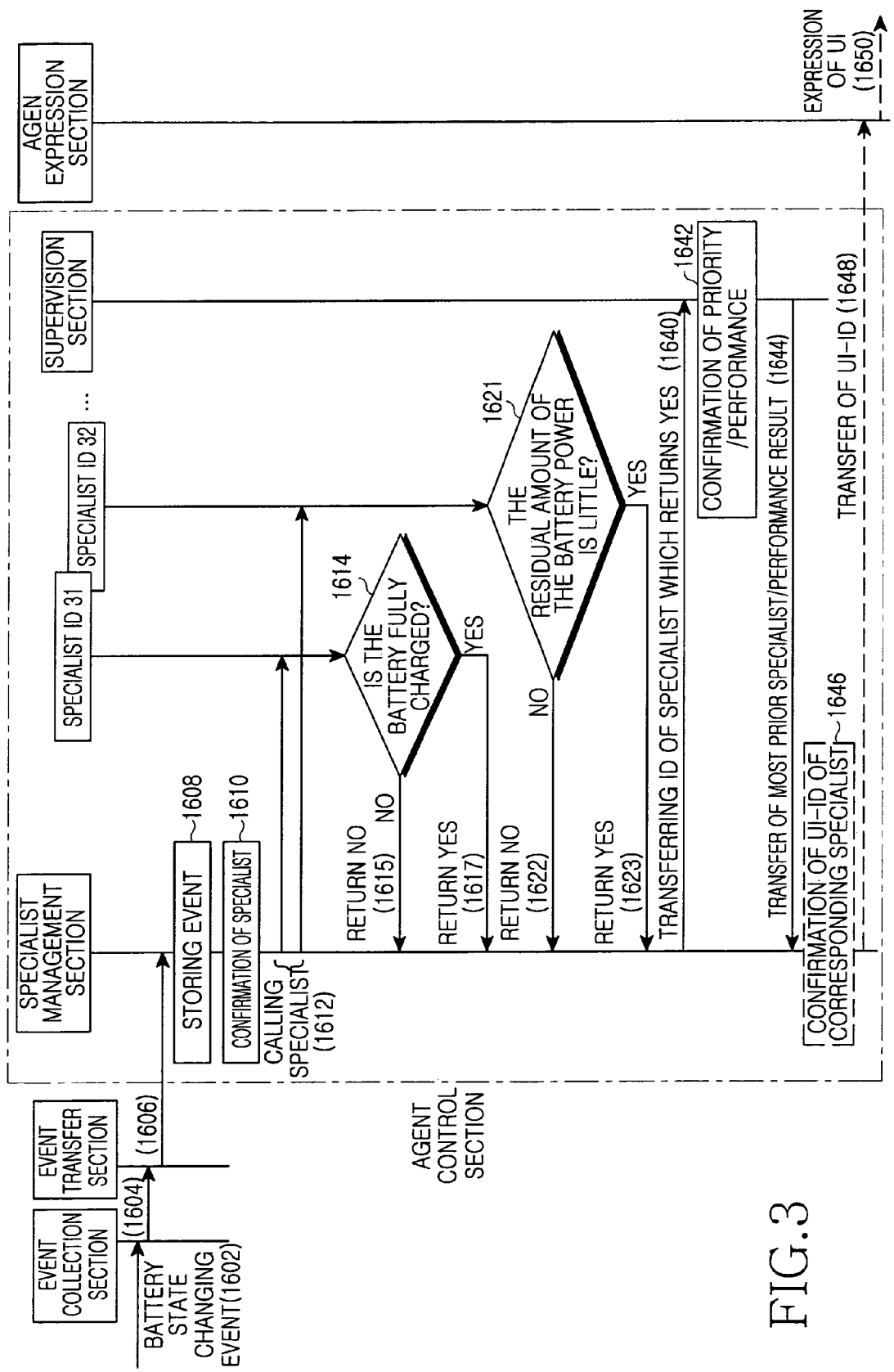
FIG. 3 is a flow chart for processing a battery state changing event in an agent function section of a portable terminal according to the first exemplary embodiment of the present invention.

FIG. 3 is a flow chart for a battery state changing event processing operation of the agent function section of the portable terminal according to the first exemplary embodiment of the present invention.

Referring to FIG. 3, if a battery state changing event is generated in Step 1602, the event collection section collects it and provides it to the event transfer section in Step 1604. The event transfer section provides the battery state changing event to the specialist management section of the agent control section in Step 1606. The specialist management section stores the received battery state changing event in the blackboard in Step 1608, confirms the specialists called in the case of the battery state changing event in the inner specialist list in

TABLE 1

| ID | Use case | Classification | Required information of control unit | UI text | User selection item |
|---|---|---|---|---|---|
| 1 | Recommending a predetermined program to a user which rarely use a phone according to the state values | System | Information on an event for which a response of a user is required | (Expression according to the state of the phone) Would you try this program together with me? | Yes/No |
| 25 | Recommending a user to change the mode of a phone to an expected bell mode when the bell mode is changed at a predetermined time | System | AP_RING_MODE_CHANGED | Do you want to change the mode of the phone to the [vibration/bell] mode? | Yes/No |
| 31 | Displaying an avatar if the battery is fully charged | System | | Wow, I am powered up. Thank you, lord. | Confirmation |
| 32 | Informing a user of the residual amount of the battery power if the battery power is low | System | | I am hungry. Please, give me some food. | Confirmation |
| 35 | Informing a user of the intensity of a signal received by a phone if the wave is weak | System | | The wave is weak. Where am I? | Confirmation |
| 37 | Informing a user of whether the memory space of a portable terminal is little | System | | My brain is so complicated. Please empty some memory space. | Confirmation |
| 42 | Recommending a user to change the bell sound of the portable terminal if it has been a long time since the bell sound was changed | System | AP_RING_SOUND_CHANGED | Lord! You have been using the same bell sound for months. Would you change the bell sound? | Yes/No |
| 43 | Recommending a user to change the background of the portable terminal if it has been a long time since the background was changed | System | AP_THEME-CHANGE | Lord! You have been using the same background for months. Would you change the background? | Yes/No |

Referring to FIG. 1, the system-related event processing operation of the portable terminal according to the exemplary Step 1610, and calls the specialists in Step 1612. For example, the specialists of Ids 31 and 32 are called in FIG. 3

Of the called specialists, the ID 31 specialist confirms whether the battery is in a fully charged state, in Step 1614. After the confirmation, if the battery is not fully charged, the ID 31 specialist proceeds with Step 1615 and returns 'NO' to the specialist management. Further, if the battery is fully charged, the ID 31 specialist proceeds with Step 1617 and returns. 'YES' to the specialist management section.

Of the called specialists, the ID 32 specialist determines whether the residual amount of the battery power, is low in Step 1621. After the determination, if the residual amount of the battery power is not low, the ID 32 specialist proceeds with Step 1622 and returns 'NO' to the specialist management section. Further, if the residual amount of the battery power is low, the ID 32 specialist proceeds with Step 1623 and returns 'YES' to the specialist management section.

If a return has been performed by a called specialist, the specialist management section provides the ID, for example, ID 31 or 32 in FIG. 3, of the specialist which has returned YES to the supervision section in Step 1640. The supervision section confirms the priority of a corresponding specialist or the performance of a corresponding specialist in the case in which one specialist has returned YES, in Step 1642, and transfers the confirmation result on the performance of the most prior specialist or the corresponding specialist to the specialist management section in Step 1644. Accordingly, the specialist management section confirms the preset UI-ID according to the ID of the corresponding most prior specialist or the specialist to perform in Step 1646, and transfers the UI-ID to the agent expression section in Step 1648. Accordingly, the agent expression section can express the corresponding UI in Step 1650.

The UI expression of the agent expression section can be displayed, for example, with a text/avatar informing a user that the battery is fully charged, when the UI corresponding to the specialist ID 31 is expressed. Further, when the UI corresponding to the specialist ID 32 is expressed, a text/avatar informing a user that the residual amount of the battery power is low can be displayed.

Figure 4:
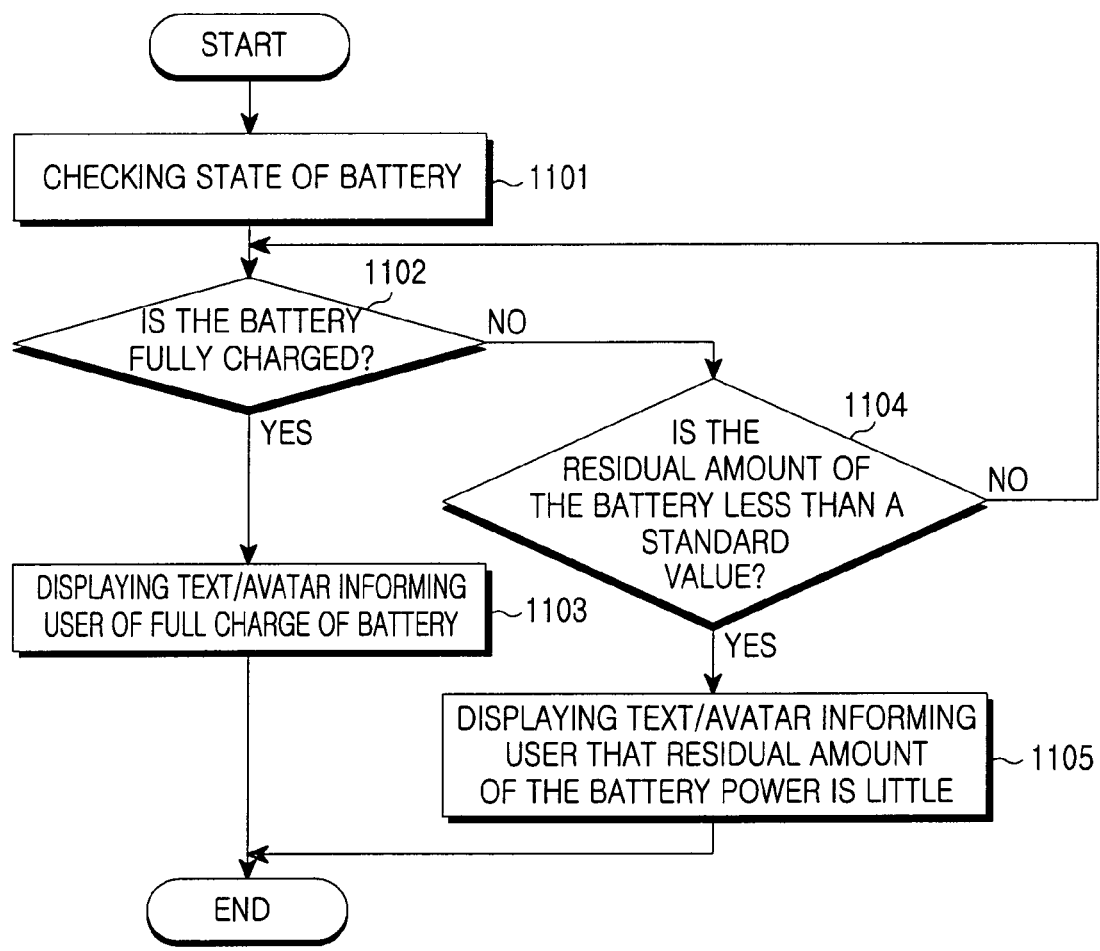
FIG. 4 is a flow chart for processing a battery state changing event in a portable terminal according to the second exemplary embodiment of the present invention.

FIG. 4 is a flow chart for a battery state changing event processing operation of the portable terminal according to the second exemplary embodiment of the present invention.

Referring to FIG. 4, if the battery state of the portable terminal is changed, the control unit 100 detects it and proceeds with Step 1101 in which the battery state of the portable terminal is checked. After the check of the battery state, it is determined if the battery is fully charged in Step 1102. If the battery is fully charged, the control unit 100 detects it and proceeds with Step 1103 in which the control unit 100 controls the portable terminal to display a text/avatar informing a user that the battery is fully charged. On the other hand, if the battery is not fully charged, control unit 100 determines if the battery power of the portable terminal is less than a predetermined threshold value in Step 1104. If the battery power of the portable terminal is not less than a predetermined threshold value it is determined if the battery is fully charged in Step 1102. If the battery power of the portable terminal is less than a predetermined threshold value the control unit 100 detects it and proceeds with Step 1105 in which the control unit 100 controls the portable terminal to display a text/avatar informing a user that the residual amount of the battery power of the portable terminal is low.

Figure 18A:
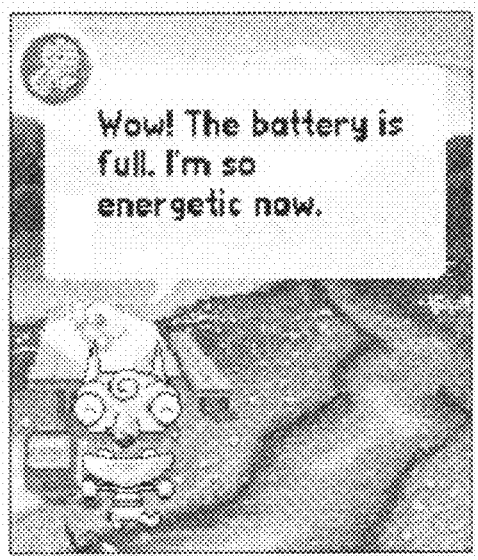
FIGS. 18A and 18B are a view of an avatar informing a user of a battery state of FIGS. 3 and 4.
Figure 18B:
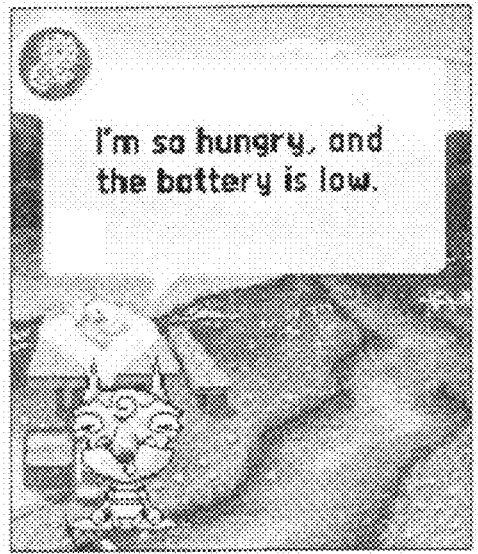

FIGS. 18A and 18B show an avatar informing a user of a battery state when a battery state changing event is generated, or Steps 1103 and 1105 of FIG. 4. If the fully charged state of the battery of the portable terminal is confirmed, the avatar is displayed as in FIG. 18A and a text informing a user that the battery of the portable terminal is fully charged is also displayed. Thereafter, if a predetermined time elapses or key input is performed for a predetermined key, the avatar disappears. Further, if it is confirmed that the residual amount of the battery power is less than a predetermined threshold value, an avatar is displayed as in FIG. 18B and a text informing a user that the residual amount of the battery power is low is displayed. Thereafter, if a predetermined time elapses or key input is performed for a predetermined key, the avatar disappears.

Figure 5:
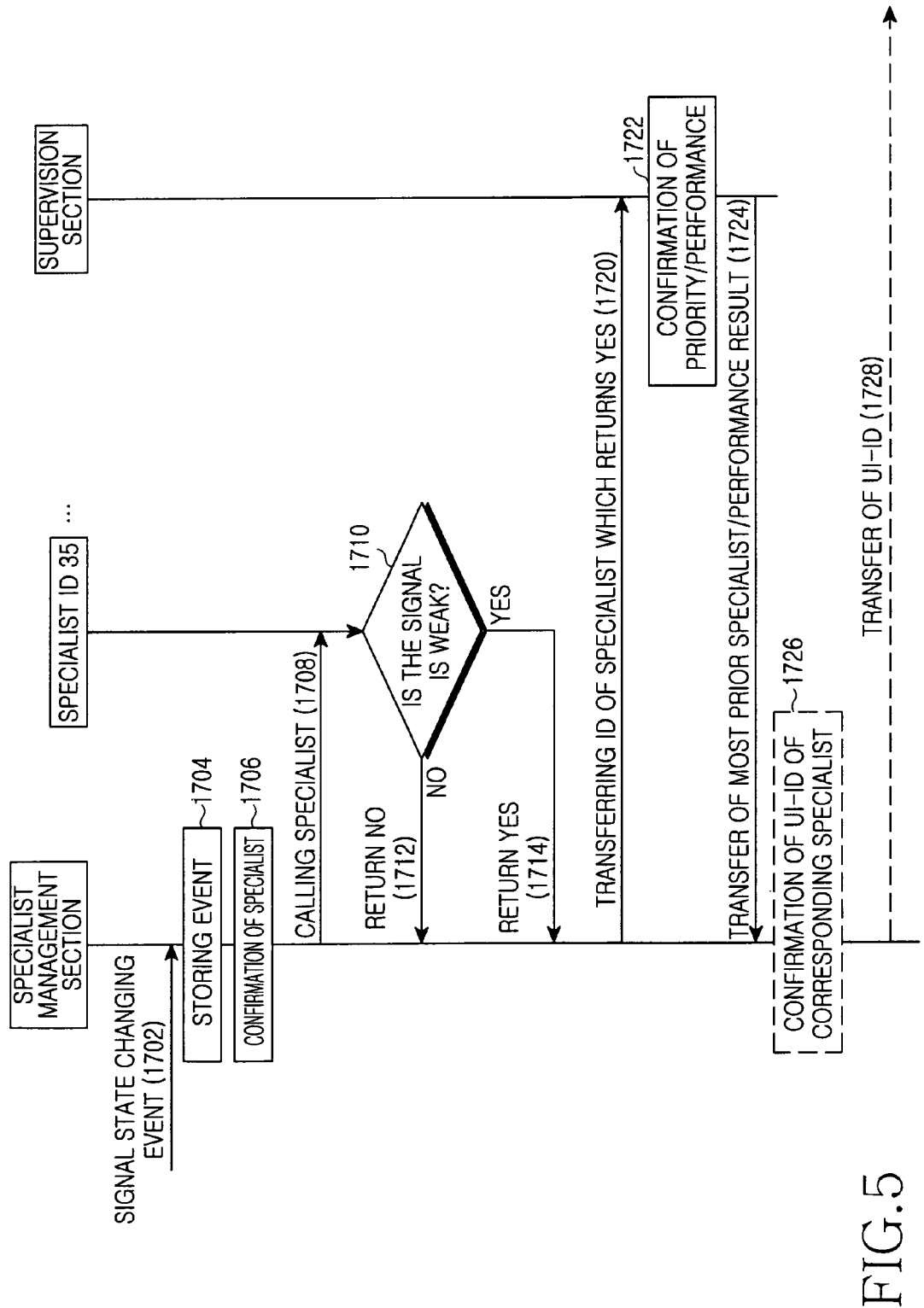
FIG. 5 is a flow chart for processing a wave state changing event in an agent function section of a portable terminal according to the first exemplary embodiment of the present invention.

FIG. 5 is a flow chart for a wave state changing event processing operation of the agent function section of the portable terminal according to the first exemplary embodiment of the present invention. Although only the operation in the agent control section is shown for convenience sake, the events provided to the corresponding control section can be provided to the event collection section and the event transfer section, as shown in FIG. 3.

Referring to FIG. 5, if the wave state changing event is transferred in Step 1702, the specialist management section stores the received wave state changing event to a blackboard in Step 1704, confirms the specialists called during the wave state changing event in the inner specialist list in Step 1706, and calls the specialists in Step 1708. In an example of FIG. 5, the ID 35 specialist is called.

The called ID 35 specialist confirms the wave state in Step 1710, and determines that the wave strength is weak if the wave strength is less than a predetermined threshold value. After the determination, if the wave strength is not weak, the ID 35 specialist proceeds with Step 1712 and returns 'NO' to the specialist management section. If the wave strength is weak, the ID 35 specialist proceeds with Step 1714 and returns 'YES' to the specialist management section.

If return is performed by the called specialist, such as ID 35, the specialist management section provides the ID of the specialist which returns YES to the supervision section in Step 1720. Thereafter, the supervision section confirms the priority/performance of the corresponding specialists in Step 1722, and transfers the confirmation result on the most prior specialist/performance to the specialist management section in Step 1724. Accordingly, the specialist management section confirms the UI-ID of the most prior specialist or the specialist to perform in Step 1726, and expresses the corresponding UI by transferring the UI-ID to the agent expression section in Step 1728. Then, the UI expression can be performed by displaying a text/avatar informing a user that the wave strength is weak.

Figure 6:
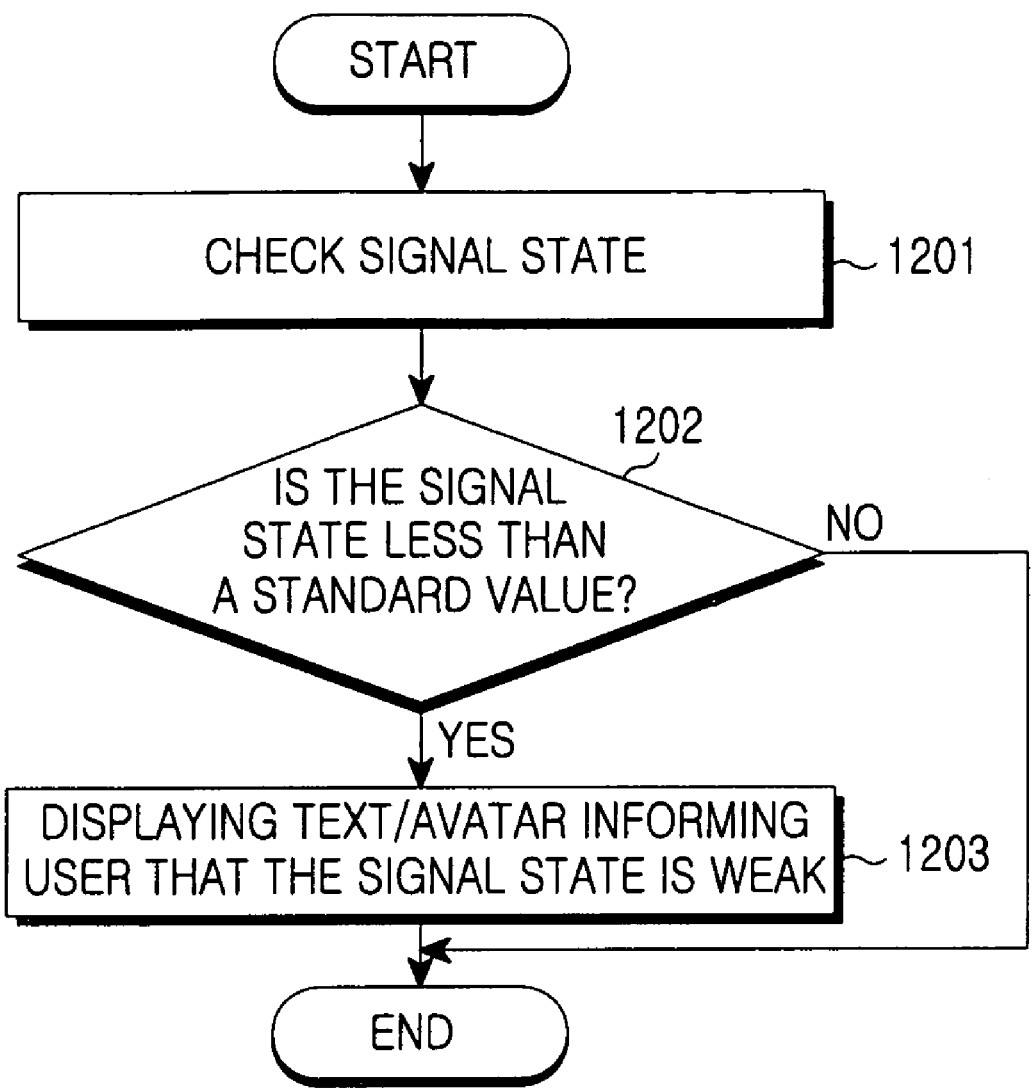
FIG. 6 is a flow chart for processing a wave state changing event in a portable terminal according to the second exemplary embodiment of the present invention.

FIG. 6 is a flow chart for showing the wave state changing event processing operation of the portable terminal according to the second exemplary embodiment of the present invention.

Referring to FIG. 6, if the wave state of the portable terminal is changed, the control unit 100 detects it and proceeds with Step 1201 in which the wave state of the portable terminal is checked. After the check of the wave state, if the wave strength is weaker than a predetermined threshold value in Step 1202, the control unit 100 detects it and proceeds with Step 1203 in which the control unit 100 controls the portable terminal to display a text/avatar informing a user that the current signal received by the portable terminal is weak.

Figure 19:
FIG. 19 is a view of an avatar informing a user of a wave state of FIGS. 5 and 6.

FIG. 19 shows an avatar informing a user of the wave state, when the wave state changing event is generated in FIG. 5 or in Step 1203 of FIG. 6. If it is confirmed that the intensity of a signal received by the portable terminal is weaker than a predetermined threshold value, according to the wave state changing event, an avatar is displayed and a text informing a user that the signal received by the portable terminal is weak, as in FIG. 19. Thereafter, if a predetermined time elapses or key input is performed for a predetermined key, the avatar disappears.

Figure 7:
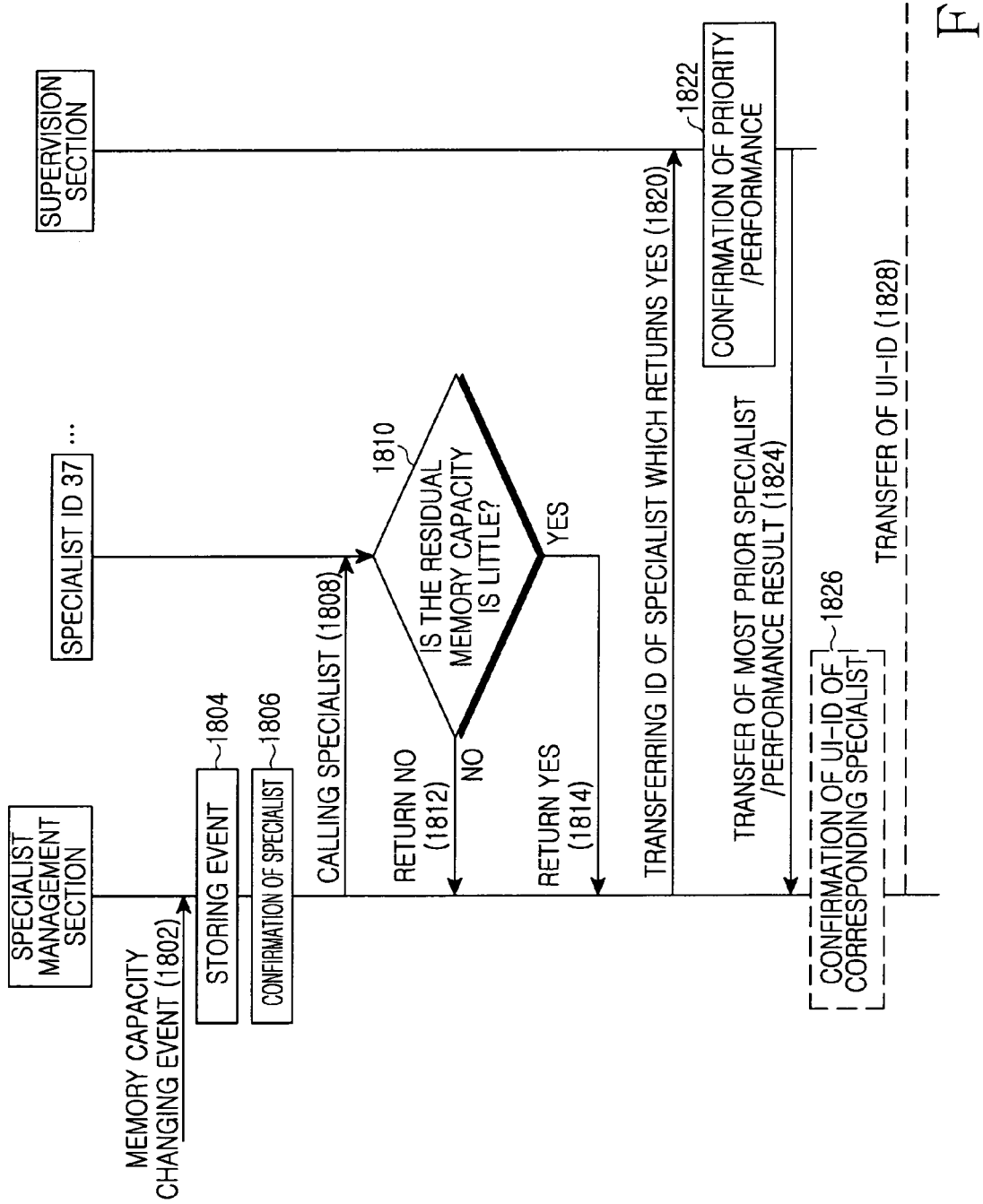
FIG. 7 is a flow chart for processing a memory capacity changing event in an agent function section of a portable terminal according to the first exemplary embodiment of the present invention.

FIG. 7 is a flow chart for the memory capacity changing event processing operation of the agent function section of the portable terminal according to the first exemplary embodiment of the present invention, and shows only the operation in the agent control section for convenience sake.

Referring to FIG. 7, if the memory capacity changing event is transferred in Step 1802, the specialist management section stores the received memory capacity changing event in a blackboard in Step 1804. Thereafter, the specialists called during the memory capacity changing event are confirmed in the inner specialist list in Step 1806, and the specialists are called in Step 1808. In an example of FIG. 7, the ID 37 specialist is called.

The called ID 37 specialist confirms the memory capacity state in Step 1810 and determines that the available memory capacity is low if the available memory capacity is less than a predetermined threshold value. After the determination, if the memory capacity is not little, the ID 37 specialist proceeds with Step 1812 and returns 'No' to the specialist management section. If the memory capacity is little, the ID 37 specialist proceeds with Step 1814 and returns 'YES' to the specialist management section.

If return is performed by the called specialist (ID 37 specialist), the specialist management section provides the ID (specialist ID 37) of the specialist which returns YES to the supervision section in Step 1820. Thereafter, the supervision section confirms the priority/performance of the corresponding specialists in Step 1822, and transfers the confirmation result on the most prior specialist/performance to the specialist management section in Step 1824. Accordingly, the specialist management section confirms the UI-ID of the most prior specialist or the specialist to perform in Step 1826, and expresses the corresponding UI by transferring the UI-ID to the agent expression section in Step 1828. Then, the UI expression can be performed by displaying a text/avatar informing a user that the available memory capacity is low.

Figure 8:
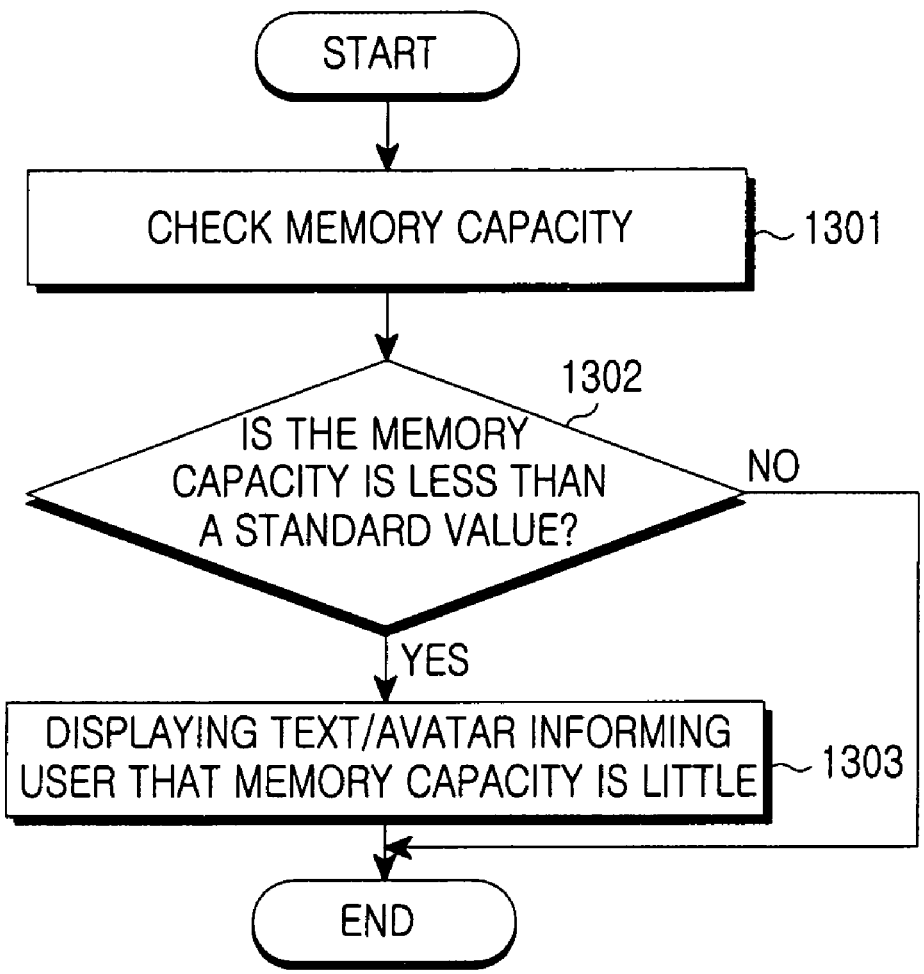
FIG. 8 is a flow chart for a processing a memory capacity changing event in a portable terminal according to the second exemplary embodiment of the present invention.

FIG. 8 is a flow chart for the memory capacity changing event processing operation of the portable terminal according to the second exemplary embodiment of the present invention.

Referring to FIG. 8, if the memory capacity of the portable terminal is changed, the control unit 100 detects it and proceeds with Step 1301 in which the available memory capacity state of the portable terminal is checked. After the check of the available memory capacity, if the available memory capacity is less than a predetermined threshold value, the control unit 100 detects it in Step 1302 and proceeds with Step 1303 in which the control unit 100 controls the portable terminal to display a text/avatar informing a user that the current available memory capacity of the portable terminal is low.

Figure 20:
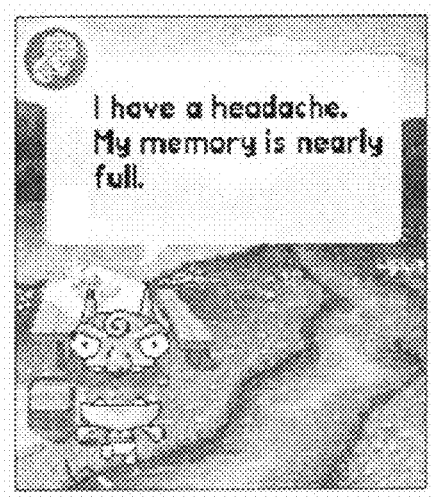
FIG. 20 is a view of an avatar informing a user of a memory capacity state of FIGS. 7 and 8.

FIG. 20 shows an avatar informing a user of the available memory capacity state, when the available memory capacity changing event is generated in FIG. 7 or in Step 1303 of FIG. 8. If it is confirmed that the available memory capacity of the portable terminal is less than a predetermined threshold value, according to the available memory capacity changing event, an avatar is displayed and a text informing a user that the available memory capacity of the portable terminal is low, as in FIG. 20. Thereafter, if a predetermined time elapses or key input is performed for a predetermined key, the avatar disappears.

Figure 9:
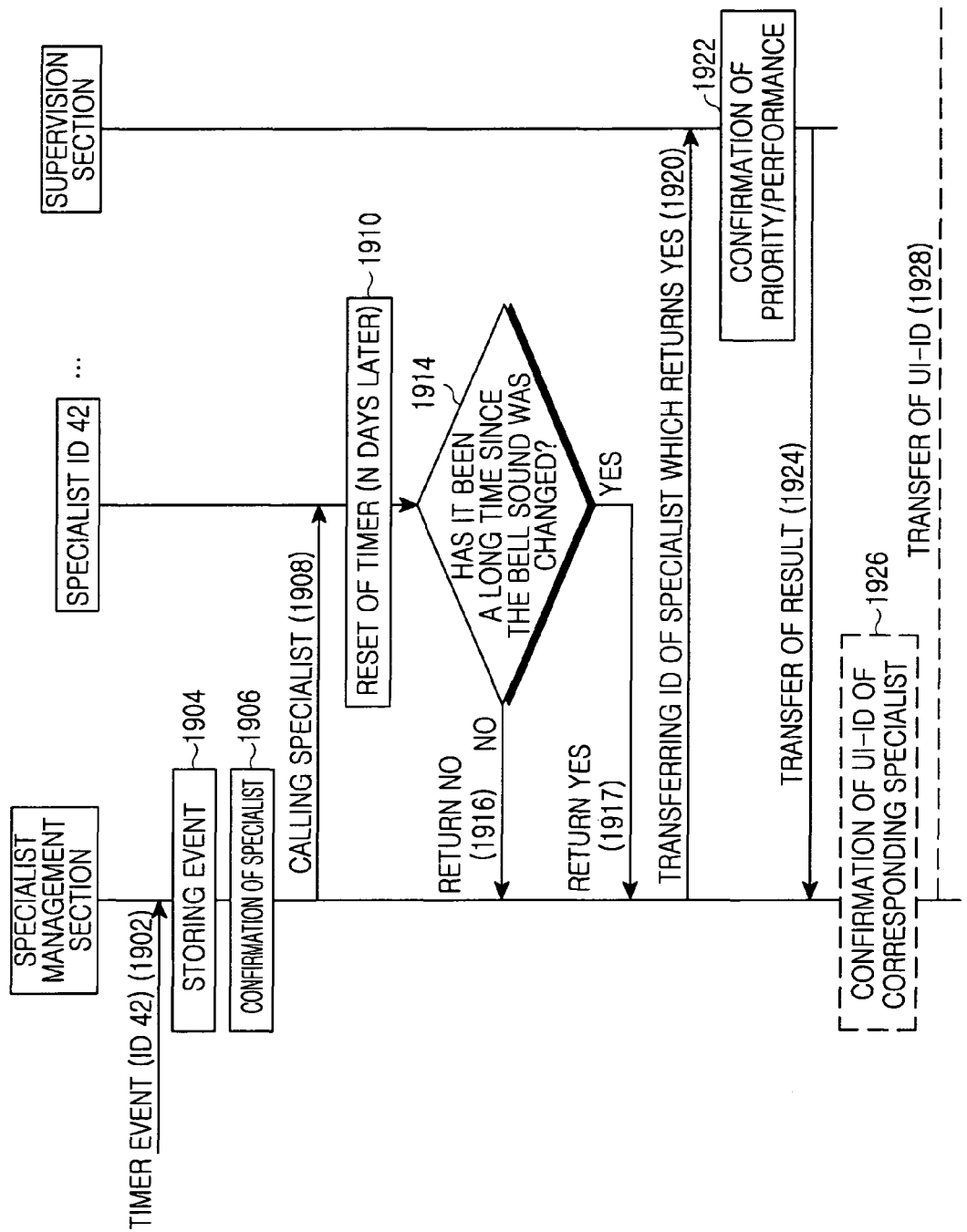
FIG. 9 is a flow chart for informing a user of a bell sound changing state in an agent function section of a portable terminal according to the first exemplary embodiment of the present invention.

FIG. 9 is a flow chart for showing the operation for informing a user of the bell sound changing state in the agent function section of the portable terminal according to the first exemplary embodiment of the present invention, and shows only the operation in the agent control section for convenience sake.

Referring to FIG. 9, for example, if the timer event of ID 42 is transferred in Step 1902, the specialist management section stores the received timer event in a blackboard in Step 1904. Thereafter, the specialists called during the timer event of ID 42 are confirmed in the inner specialist list in Step 1906, and the specialists are called in Step 1908. (In FIG. 9, the ID 42 specialist is called.)

The called ID 42 specialist resets the timer to, for example, N days later in Step 1910. The timer is reset in order that the ID 42 specialist is called N days later to be operated. Accordingly, the ID 42 specialist is called repeatedly by a period of N days to be operated. Thereafter, the ID 42 specialist confirms the bell sound changing day through the blackboard, and determines that it has been a long time since the bell sound was changed in Step 1914, if the bell sound changing day exceeds a predetermined threshold day. After the determination, if it has not been a long time since the bell sound was changed, the ID 42 specialist proceeds with 1916 to return 'NO' to the specialist management section, and if it has been a long time since the bell sound was changed, the specialist proceeds with Step 1917 to return 'YES'.

If return is performed by the called specialist, such as ID 42, the specialist management section provides the ID of the specialist which returns YES to the supervision section in Step 1920. Thereafter, the supervision section confirms the priority/performance of the corresponding specialists in Step 1922, and transfers the confirmation result on the most prior specialist/performance to the specialist management section in Step 1924. Accordingly, the specialist management section confirms the UI-ID of the most prior specialist or the specialist to perform in Step 1926, and expresses the corresponding UI by transferring the UI-ID to the agent expression section in Step 1928. Then, the UI expression can be performed by displaying a text/avatar recommending a user to change the bell sound.

Figure 10:
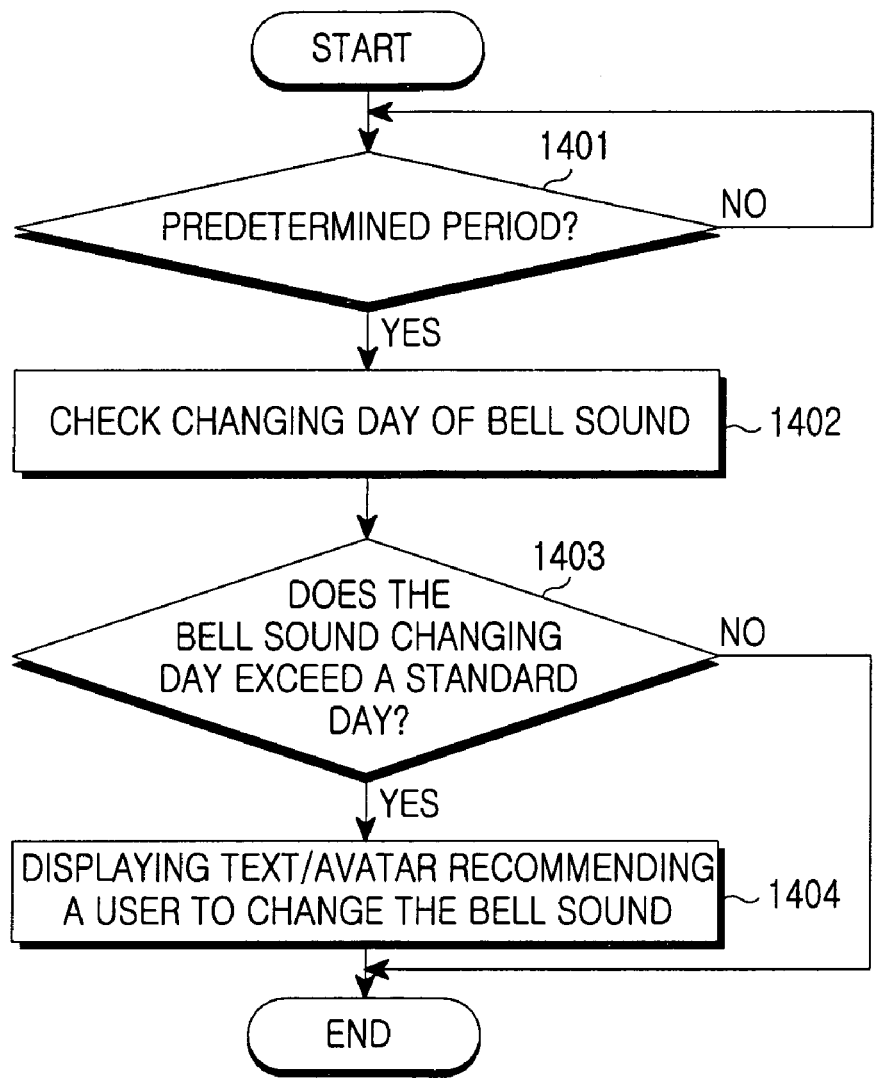
FIG. 10 is a flow chart for informing a user of a bell sound changing state in a portable terminal according to the second exemplary embodiment of the present invention.

FIG. 10 is a flow chart for showing the operation informing a user of the bell sound changing state in the portable terminal according to the second exemplary embodiment of the present invention.

Referring to FIG. 10, if a predetermined period for checking the bell sound changing day in the portable terminal elapses, the control unit 100 detects it in Step 1401 and proceeds with Step 1402 in which the last bell sound changing day is checked. After the check, if the bell sound changing day exceeds a predetermined predetermined threshold day, the control unit 100 detects that it has been a long time since the bell sound was changed in Step 1403 and proceeds with Step 1404 in which the control unit 100 controls the portable terminal to display a text/avatar recommending a user to change the bell sound.

Figure 21C:
FIGS. 21A-21C are a view of an avatar recommending a user to change the bell sound in FIGS. 9 and 10.
Figure 21B:
Figure 21A:
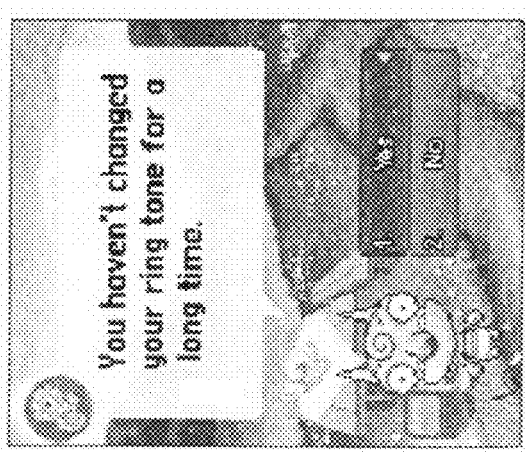

FIGS. 21A-21C represents an avatar which informs the change of the bell sound, when a timer event of ID 42 is generated in FIG. 9 or in Step 1404 of FIG. 10. If the timer event of ID 42 is generated, due to the bell sound changing day exceeding a threshold day, as shown in FIG. 21A, an avatar is displayed and a text which informs a use that it has been a long time since the bell sound was changed and recommends a user to change the bell sound. Then, if "1. Yes" is selected, as shown in FIG. 21B, the avatar displays a text informing the user of it, with a glad expression. Further, if a predetermined time period elapses or key input is performed for a predetermined key, the avatar disappears and the mode of the portable terminal is converted to a mode in which the bell sound can be changed. However, if "2. No" is selected, as shown in FIG. 21C, the avatar displays a text informing a user of it, with a sorrowful expression. Further, if a predetermined time period elapses or key input is performed for a predetermined key, the avatar disappears.

Figure 11:
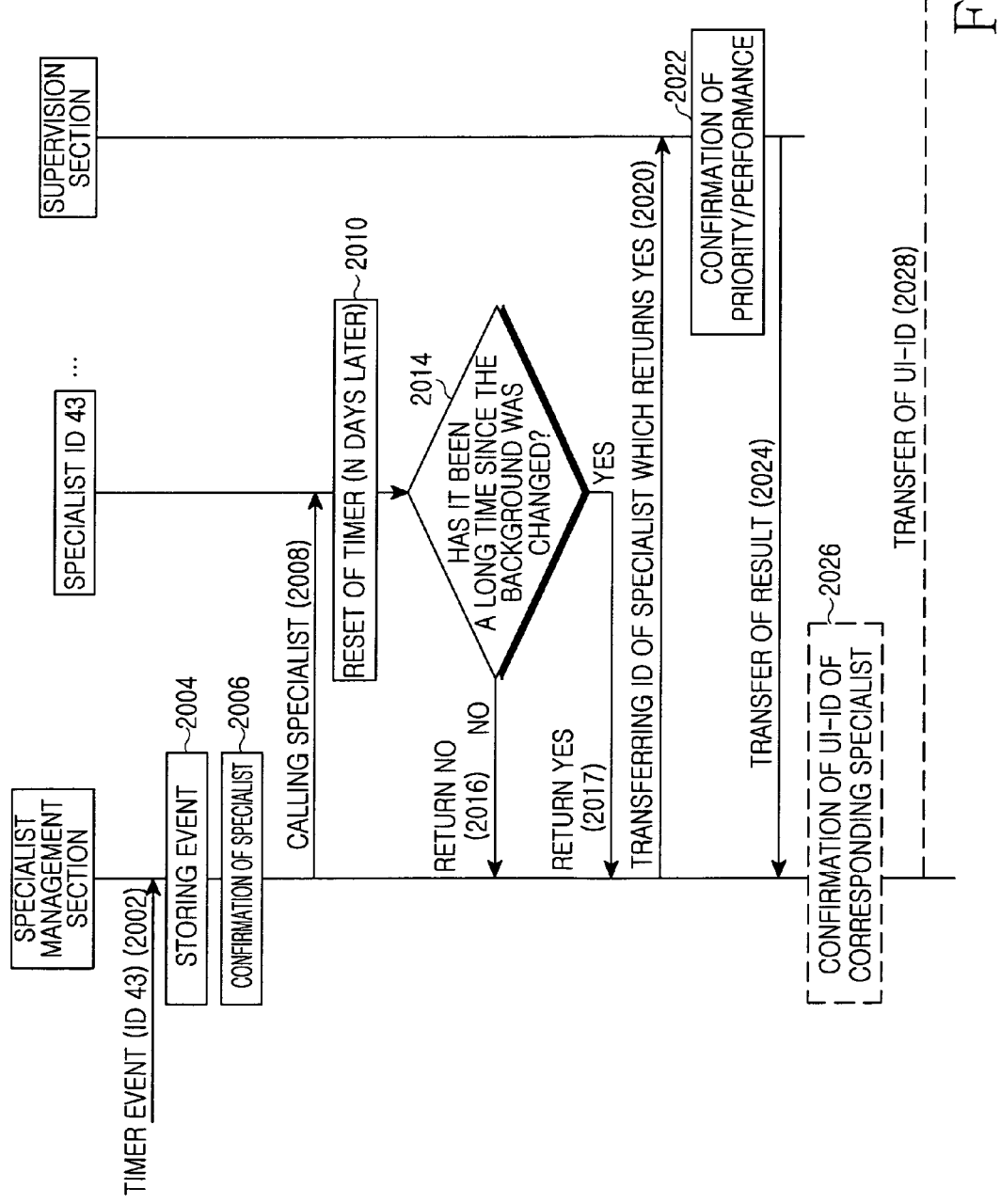
FIG. 11 is a flow chart for informing a user of a background changing state in an agent function section of a portable terminal according to the first exemplary embodiment of the present invention.

FIG. 11 is a flow chart for informing a user of the background changing state in the agent function section of the portable terminal according to the first exemplary embodiment of the present invention, and shows only the operation in the agent control section for convenience sake.

Referring to FIG. 11, for example, if the timer event of ID 43 is transferred in Step 2002, the specialist management section stores the received timer event in a blackboard in Step 2004. Thereafter, the specialists called during the timer event of ID 43 are confirmed in the inner specialist list in Step 2006, and the specialists are called in Step 2008. In FIG. 11, the ID 43 specialist is called.

The called ID 43 specialist resets the timer to, for example, N days later in Step 2010. The timer is reset in order that the ID 43 specialist is called N days later to be operated. Accordingly, the ID 43 specialist is called repeatedly after a period of N days to be operated. Thereafter, the ID 43 specialist confirms the background changing day through the blackboard in Step 2014, and determines that it has been a long time since the background was changed, if the background changing day exceeds a predetermined threshold day. After the determination, if it has not been a long time since the background was changed, the ID 43 specialist proceeds with 2016 to return 'NO' to the specialist management section, and if it has been a long time since the background was changed, the specialist proceeds with Step 2017 to return 'YES'.

If return is performed by the called specialist, such as ID 43, the specialist management section provides the ID of the specialist which returns YES to the supervision section in Step 2020. Thereafter, the supervision section confirms the priority/performance of the corresponding specialists in Step 2022, and transfers the confirmation result on the most prior specialist/performance to the specialist management section in Step 2024. Accordingly, the specialist management section confirms the UI-ID of the most prior specialist or the specialist to perform in Step 2026, and expresses the corresponding UI by transferring the UI-ID to the agent expression section in Step 2028. Then, the UI expression can be performed by displaying a text/avatar recommending a user to change the background.

Figure 12:
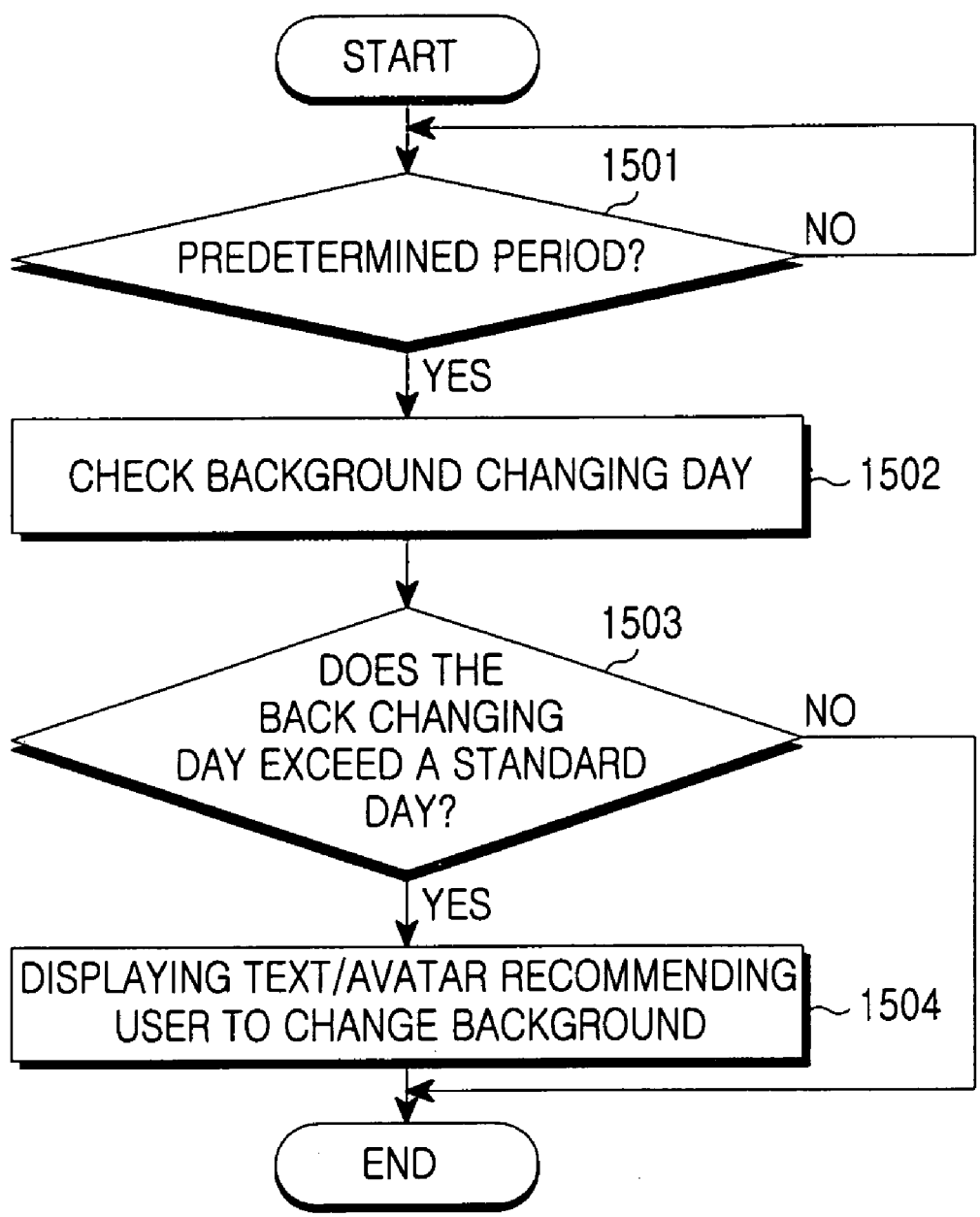
FIG. 12 is a flow chart for informing a user of a background changing state in a portable terminal according to the second exemplary embodiment of the present invention.

FIG. 12 is a flow chart for informing a user of the background changing state in the portable terminal according to the second exemplary embodiment of the present invention.

Referring to FIG. 12, if a predetermined period for checking the background changing day in the portable terminal elapses, the control unit 100 detects it in Step 1501 and proceeds with Step 1502 in which the last background changing day is checked. After the check, if the last bell sound changing day exceeds a predetermined threshold day, the control unit 100 detects that it has been a long time since the background was changed in Step 1503 and proceeds with Step 1504 in which the control unit 100 controls the portable terminal to display a text/avatar recommending a user to change the background.

Figure 22C:
FIG. 22A-22C are a view of an avatar recommending a user to change the background in FIGS. 11 and 12.
Figure 22B:
Figure 22A:
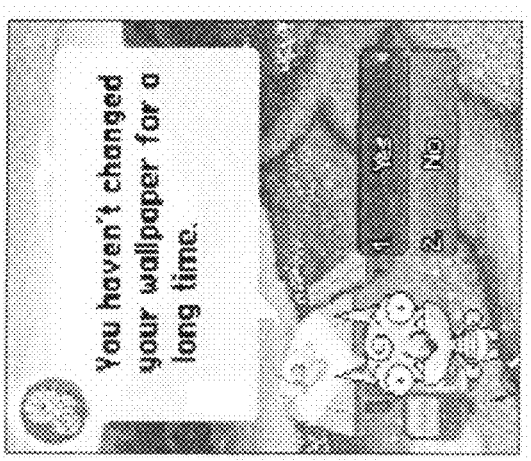

FIGS. 22A-22C represent an avatar which informs the change of the background, when a timer event of ID 43 is generated in FIG. 11 or in Step 1504 of FIG. 12. If the generation of the timer event of ID 43, the background changing day exceeds a threshold day, as shown in FIG. 22A, an avatar is displayed and a text which informs a use that it has been a long time since the background was changed and recommends a user to change the background. Then, if "1. Yes" is selected, as shown in FIG. 22B, the avatar displays a text informing the user of it, with a glad expression. Further, if a predetermined time period elapses or key input is performed for a predetermined key, the avatar disappears and the mode of the portable terminal is converted to a mode in which the bell sound can be changed. However, if "2. No" is selected, as shown in FIG. 21C, the avatar displays a text informing a user of it, with a sorrowful expression. Further, if a predetermined time period elapses or key input is performed for a predetermined key, the avatar disappears.

Figure 13:
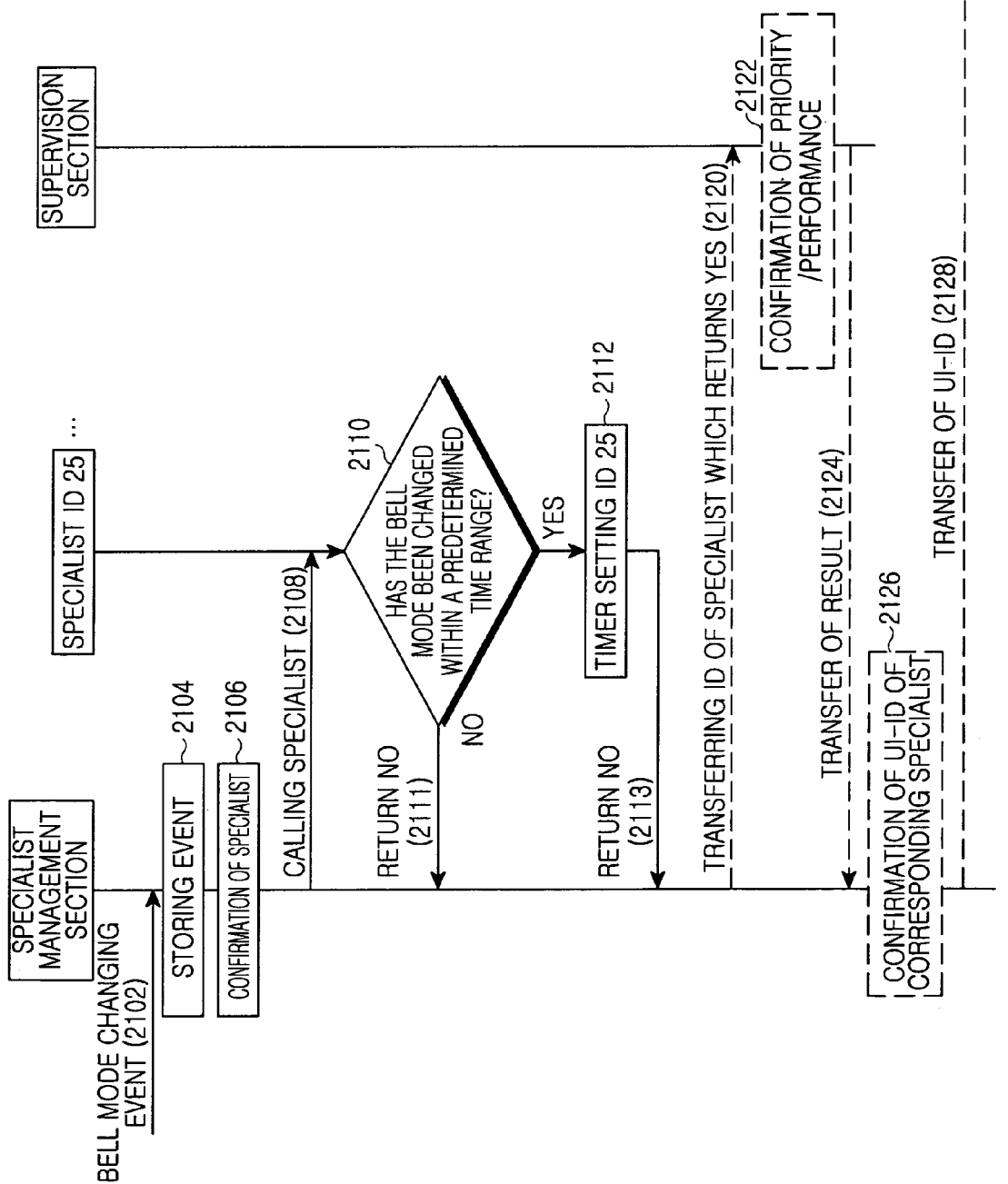
FIG. 13 is a flow chart for a bell mode changing event in an agent function section of a portable terminal according to the first exemplary embodiment of the present invention.

FIG. 13 is a flow chart for showing the bell mode changing event processing operation of the agent function section of the portable terminal according to the first exemplary embodiment of the present invention, and shows only the operation in the agent control section for convenience sake.

Referring to FIG. 13, for example, if the timer event of ID 43 is transferred in Step 2102, the specialist management section stores the bell mode changing event in a blackboard in Step 2104. Thereafter, the specialists called during the bell mode changing event are confirmed in the inner specialist list in Step 2106, and the specialists are called in Step 2108. In FIG. 13, the ID 25 specialist is called.

The called ID 25 specialist determines whether the bell mode has been consecutively changed more than a predetermined number of times, for example, more than three times within a predetermined time range. After the determination, if the bell mode has not been consecutively changed more than the predetermined number of times in Step 2110, the specialist proceeds with Step 2111 and returns 'NO' to the specialist management section. On the other hand, if the bell mode has been consecutively changed more than the predetermined number of times, the specialist proceeds with Step 2112 and returns 'NO' to the specialist management section in Step 2113 after setting a suitable timer, such as ID 25. The predetermined time range may be from a first predetermined time earlier than the time at which the bell mode was changed to the time at which the bell mode was changed, from the time at which the bell mode was changed to a second predetermined time later than the time at which the bell mode was changed, or from the first predetermined time to the second predetermined time.

If return is performed by the called specialist, such as ID 25, the specialist management section provides the ID of the specialist which has returned YES to the supervision section in Step 2120. However, since the specialist called when the bell mode is changed is only the ID 25 specialist in FIG. 13, according to the exemplary embodiment of the present invention, the ID 25 specialist always returns NO in this case, a specialist ID to be transferred to the supervision by the specialist management section in Step 2120 does not exist. However, a specialist which receives the corresponding bell mode changing event and returns YES can exist, in another exemplary embodiment of the present invention, and in this case, the specialist management section can provide the ID of the specialist which returned YES to the supervision section in Step 2120. Thereafter, the supervision section confirms the priority/performance of the corresponding specialists in Step 2122, and transfers the confirmation result to the specialist management section in Step 2124. Accordingly, the specialist management section confirms the UI-ID of the most prior specialist or the specialist to perform in Step 2126, and expresses the corresponding UI by transferring the UI-ID to the agent expression section in Step 2128.

Figure 14:
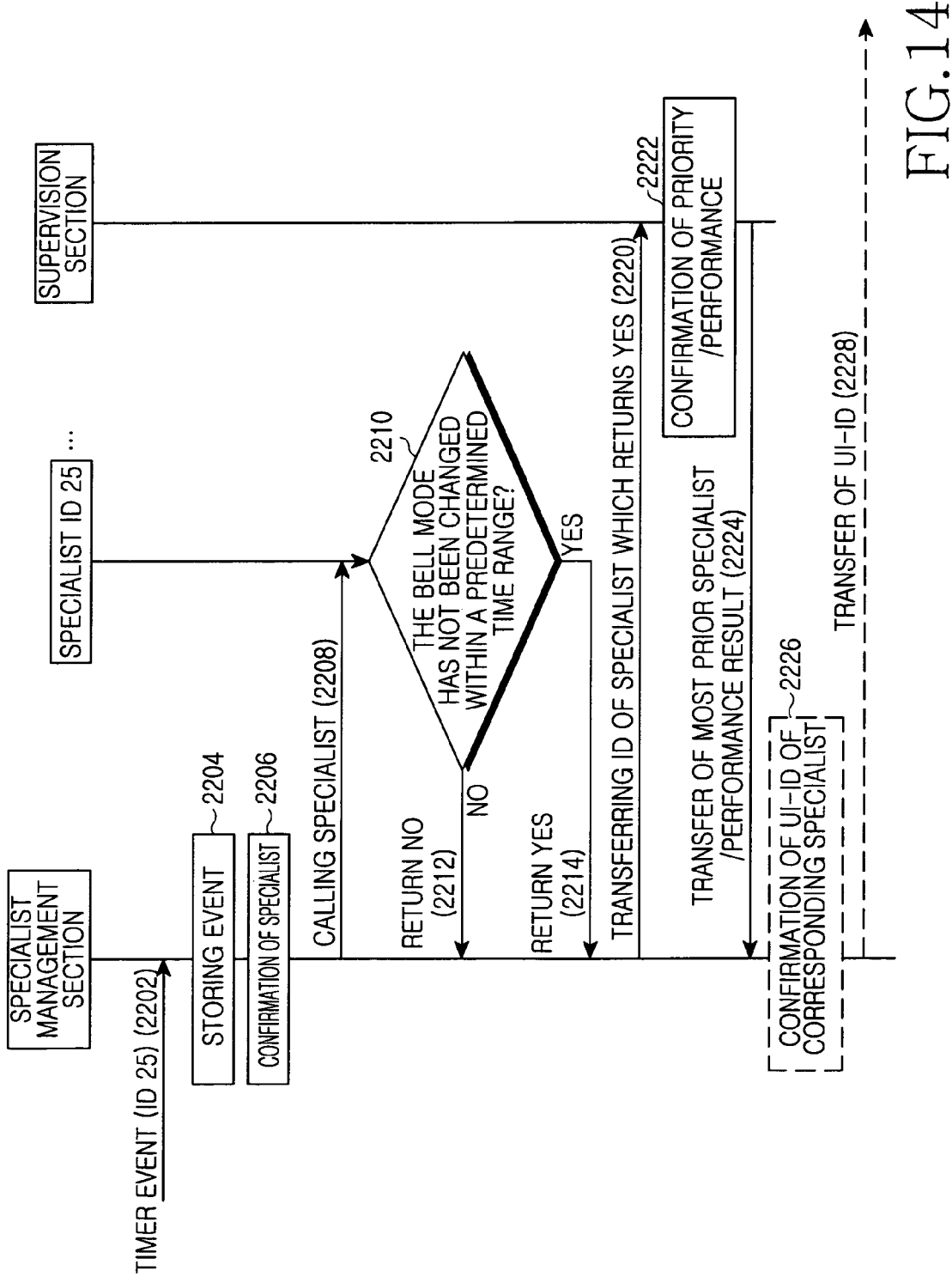
FIG. 14 is a flow chart for a processing a timer event set by a specialist of FIG. 13.

FIG. 14 is a flow chart for showing the timer event processing operation set by specialist, such as ID 25, in FIG. 3, and shows only the operation in the agent control section for convenience sake. Referring to FIG. 14, if the timer event is transferred in Step 2202, the specialist management section stores the received timer event in a blackboard in Step 2204. Thereafter, the specialists called during the timer event are confirmed in the inner specialist list in Step 2206, and the specialists are called in Step 2208. In an example of FIG. 14, the ID 25 specialist is called.

The called ID 25 specialist confirms whether the bell mode is changed in Step 2210. If the bell mode has been changed, the ID 25 specialist proceeds with Step 2212 and returns 'No' to the specialist management section. If the bell mode has not been changed, the ID 25 specialist proceeds with Step 2214 and returns 'YES' to the specialist management section.

If return is performed by the called specialist, such as ID 25, the specialist management section provides the ID, such as ID 37, of the specialist which returns YES to the supervision section in Step 2220. Thereafter, the supervision section confirms the priority/performance of the corresponding specialists in Step 2222, and transfers the confirmation result to the specialist management section in Step 2224. Accordingly, the specialist management section confirms the UI-ID of the most prior specialist or the specialist to perform in Step 2226, and expresses the corresponding UI by transferring the UI-ID to the agent expression section in Step 2228. Then, the UI expression can be performed by displaying a text/avatar recommending change of the bell mode.

For example, if the bell mode was changed at 10:00 on the first day, at 10:20 on the second day, and at 10:10 on the third day, since the bell mode has been changed consecutively at more than a predetermined number of times, such as more than three times, the ID 25 timer is set. Further, according to the generation of the timer event of ID 25 on the fourth day, it is confirmed whether the bell mode has been changed within a predetermined time range. Then, the predetermined time range according to the generation of the ID 25 timer event can be from a first predetermined time, such as 9:40, earlier than the final bell mode changing time by a predetermined time, such as 30 minutes, to the final bell mode changing time, such as 10:10, at which the bell mode was changed on the third day. Further, the predetermined time range according to the generation of the time event of ID 25, can be from the final bell mode changing time (10:10) to a second predetermined time (10:40) later than the final bell mode changing time by a predetermined time, such as 30 minutes. Further, the predetermined time range according to the generation of the time event of ID 25 can be the first predetermined time, such as 9:40, to the second predetermined time, such as 10:40.

Figure 15:
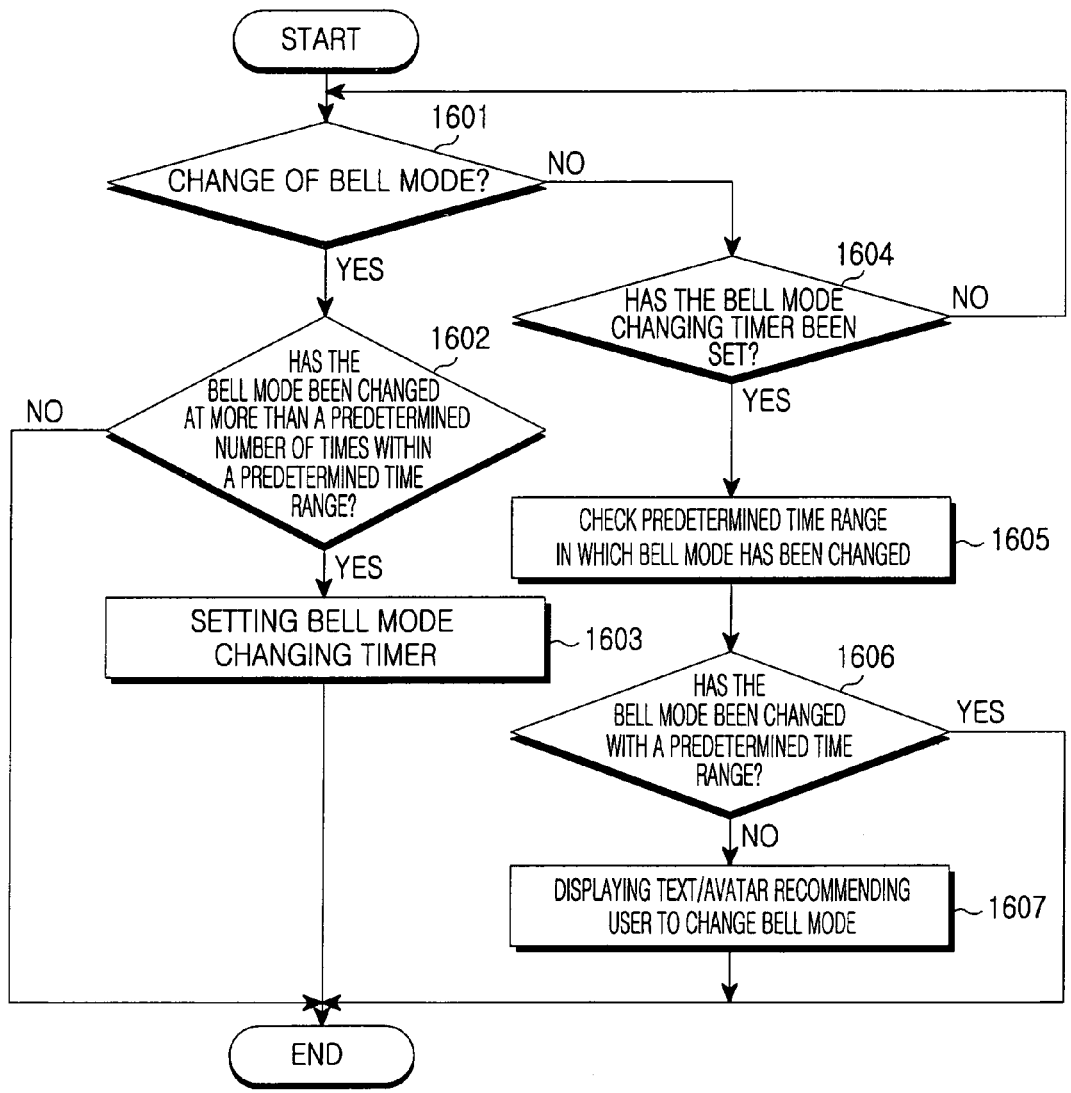
FIG. 15 is a flow chart for a processing a bell mode changing event in a portable terminal according to the second exemplary embodiment of the present invention.

FIG. 15 is a flow chart for the bell mode changing event processing operation of the portable terminal according to the second exemplary embodiment of the present invention.

Referring to FIG. 15, if the bell mode of the portable terminal is changed, the control unit 100 detects it in Step 1601 and checks whether the bell mode is changed within a predetermined time range at more than a predetermined number of times. If the bell mode is changed in the predetermined time range at more than the predetermined number of times, the control unit 100 detects it in Step 1602 and proceeds with Step 1603 in which the bell mode changing timer is set. The predetermined time range may be from a first predetermined time earlier than the time at which the bell mode was changed to the time at which the bell mode was changed, from the time at which the bell mode was changed to a second predetermined time later than the time at which the bell mode was changed, or from the first predetermined time to the second predetermined time. Therefore, in the case in which the bell mode changing time is set in Step 1603, the time at which the bell mode was finally performed is stored.

Thereafter, if the bell mode changing timer is set in the portable terminal, the control unit 100 detects it in Step 1604 and proceeds with Step 1605 in which a predetermined time range within which the bell mode was changed is checked. If it reaches the predetermined time range, the control unit 100 detects it and confirms whether the bell mode is changed within the predetermined time range in Step 1606. In other words, whether the bell mode has been changed, from a first predetermined time earlier than the time at which the bell mode was changed to the time at which the bell mode was changed, from the time at which the bell mode was changed to a second predetermined time later than the time at which the bell mode was changed, or from the first predetermined time to the second predetermined time, is checked. If the bell mode is not changed within the predetermined time range, the control unit 100 detects it and proceeds with Step 1607 in which the control unit 100 controls the portable terminal to display a text/avatar recommending a user to change the bell mode.

Figure 23C:
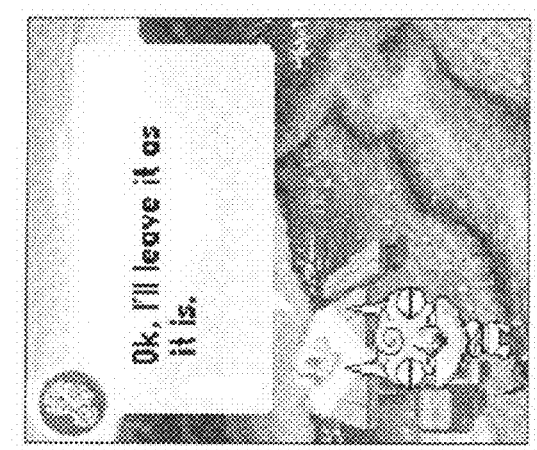
FIG. 23A-23C are a view of an avatar recommending a user to change the bell mode in FIGS. 13 to 15.
Figure 23B:
Figure 23A:
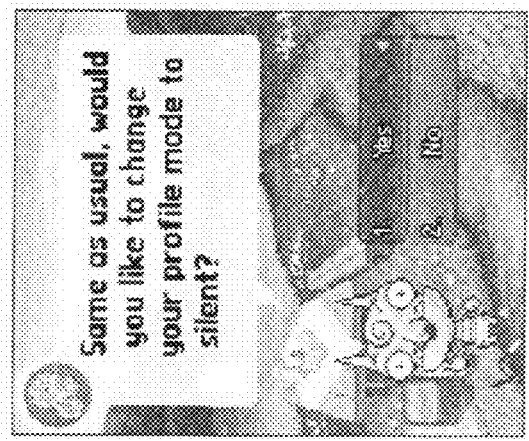

FIGS. 23A-23C show an avatar informing the change of the bell mode when a timer event of ID 25 is generated in FIG. 14 or Step 1607 in FIG. 15. If the timer event of ID 25 is not generated, due to the bell mode is not being changed within the predetermined time range, the avatar is displayed and a text recommending a user to change the bell mode is displayed, in FIG. 23A. Then, if "1. Yes" is selected, as shown in FIG. 23B, the avatar displays a text informing the user of it, with a glad expression. Further, if a predetermined time period elapses or key input is performed for a predetermined key, the avatar disappears and the mode of the portable terminal is converted to a mode in which the bell sound can be changed. However, if "2. No" is selected, as shown in FIG. 23C, the avatar displays a text informing a user of it, with a sorrowful expression. Further, if a predetermined time period elapses or key input is performed for a predetermined key, the avatar disappears.

Figure 16:
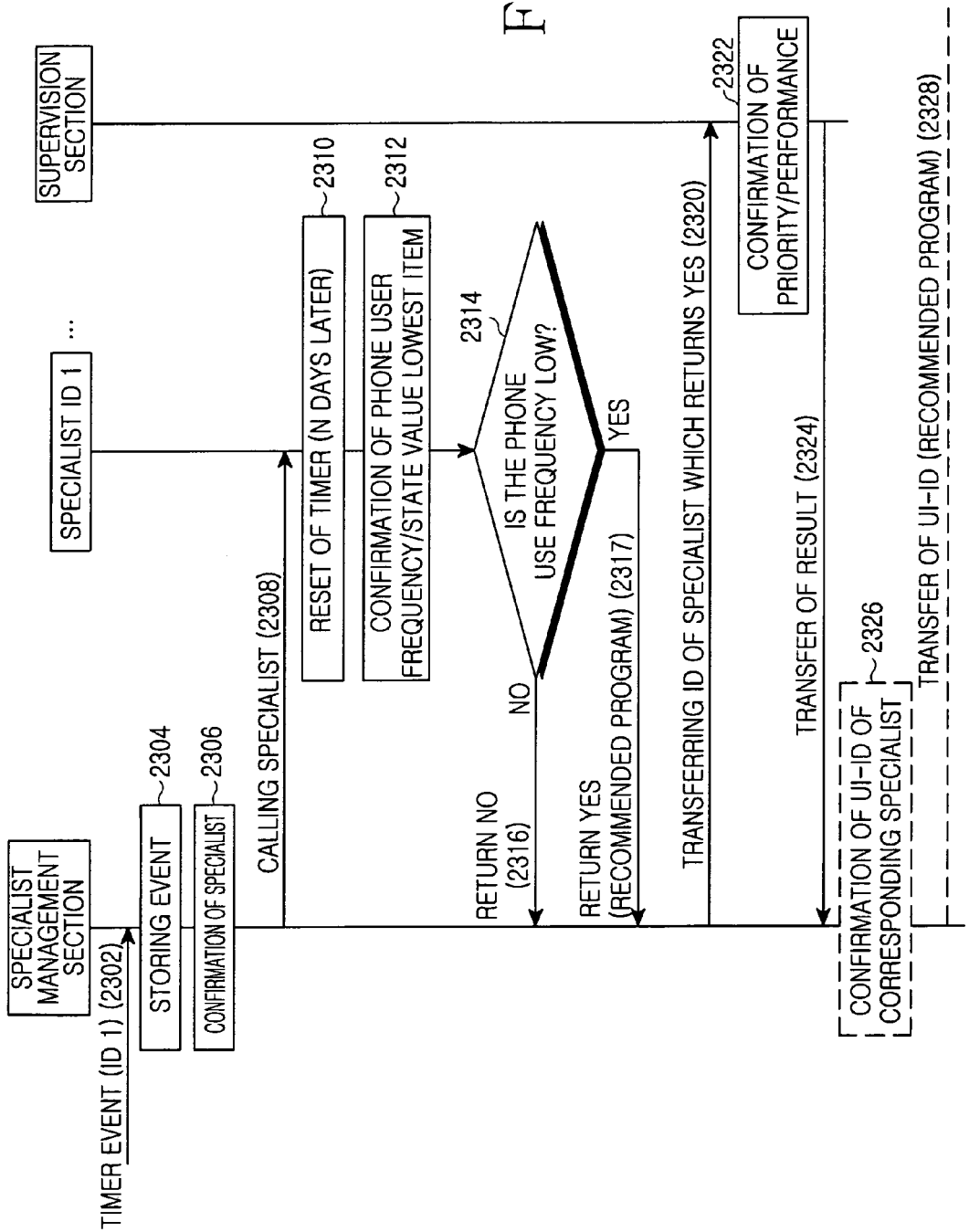
FIG. 16 is a flow chart for informing a user of a phone in-use state in an agent function section of a portable terminal according to the first exemplary embodiment of the present invention.

FIG. 16 is a flow chart for showing the operation for informing a user of the phone in-use state in the agent function section of the portable terminal according to the first exemplary embodiment of the present invention, and shows only the operation in the agent control section for convenience sake.

Referring to FIG. 16, for example, if the timer event of ID 1 is transferred in Step 2302, the specialist management section stores the received timer event in a blackboard in Step 2304. Thereafter, the specialists called during the timer event of ID 1 are confirmed in the inner specialist list in Step 2306, and the specialists are called in Step 2308. In FIG. 16, the ID 1 specialist is called.

The called ID 1 specialist resets the timer to, for example, N days later in Step 2310. The timer is reset in order that the ID 1 specialist is called N days later to be operated. Accordingly, the ID 1 specialist is called repeatedly by a period of N days to be operated. Thereafter, in Step 2312, the use frequency of the corresponding phone and the lowest item the avatar state value are confirmed, and a preset application program item to be recommended is confirmed. Then, if the phone use frequency is not lower than a predetermined threshold value, the ID 1 specialist determines it in Step 2314 and proceeds with Step 2316 to return 'NO' to the specialist management section. On the other hand, if the phone use frequency is lower than the predetermined threshold value, the ID 1 specialist proceeds with Step 2317 to return 'YES' to the specialist management section. Then, the recommended application program information can be transferred when YES is returned, in Step 2317.

If return is performed by the called specialists such as ID 1, the specialist management section provides the ID of the specialist which returns YES to the supervision section in Step 2320. Thereafter, the supervision section confirms the priority/performance of the corresponding specialists in Step 2322, and transfers the confirmation result on the most prior specialist/performance to the specialist management section in Step 2324. Accordingly, the specialist management section confirms the UI-ID of the most prior specialist or the specialist to perform in Step 2326, and expresses the corresponding UI by transferring the UI-ID to the agent expression section in Step 2328. The recommended program information is transferred at the same time when the UI-ID is transferred from the specialist management section to the agent expression section, and the agent expression section can display a text/avatar recommending the user of the corresponding recommended program when the UI is expressed.

Figure 17:
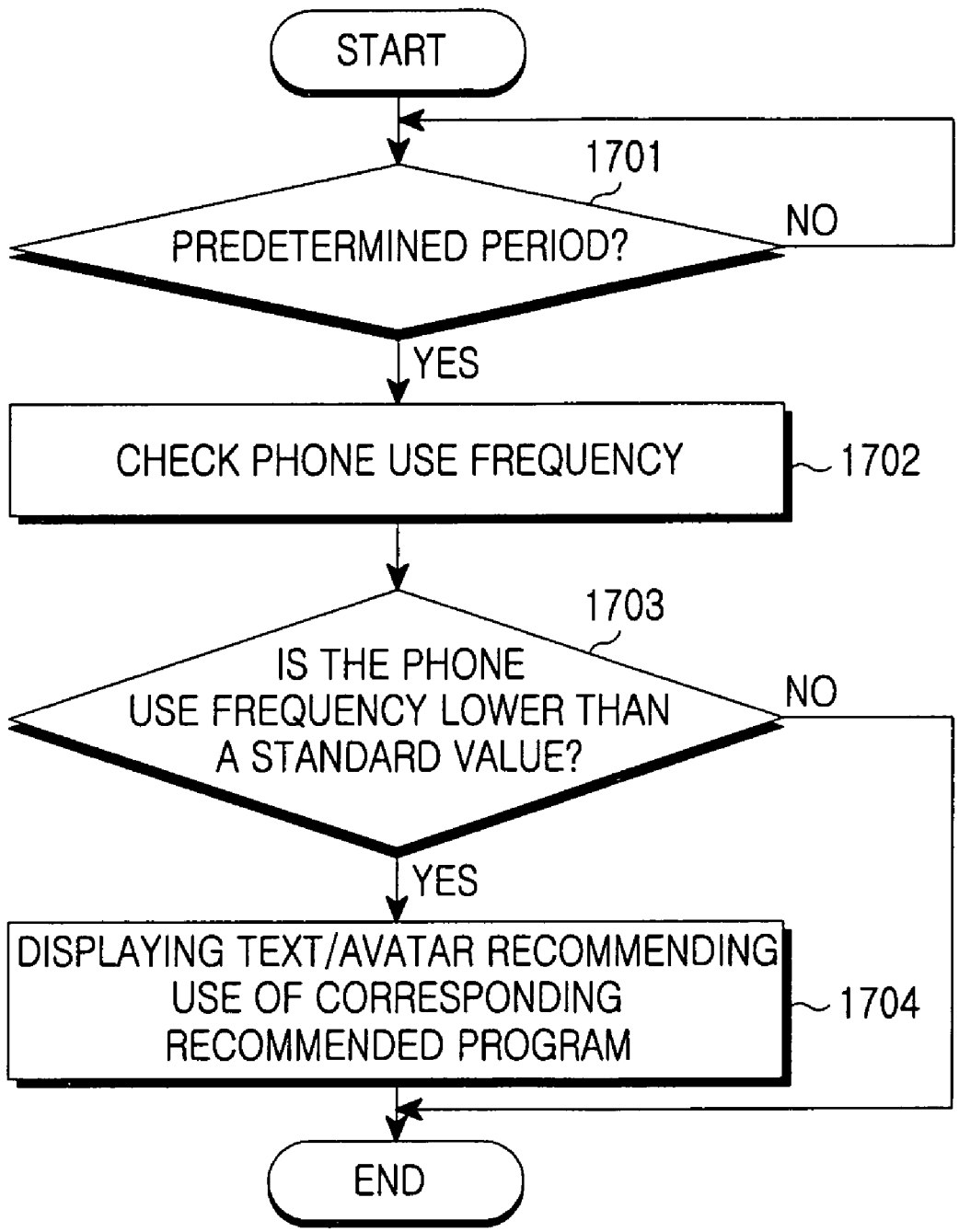
FIG. 17 is a flow chart for informing a user of a phone in-use state in a portable terminal according to the second exemplary embodiment of the present invention.

FIG. 17 is a flow chart for informing a user of the phone in-use state of the portable terminal according to the second exemplary embodiment of the present invention.

Referring to FIG. 17, if a predetermined period, in which the phone use frequency is checked, elapses, the control unit 100 detects it in Step 1701 and proceeds with Step 1702 in which the phone use frequency is checked. After the check, if the phone use frequency is lower than a predetermined threshold value, the control unit 100 detects it in Step 1703 and confirms the corresponding phone use frequency and the lowest item of the avatar state value, to confirm an application program item which is to be recommended. Thereafter, the control unit 100 proceeds with Step 1704 in which the control unit 100 controls the portable terminal to display a text/avatar recommending the use of the recommended program.

Figure 24A:
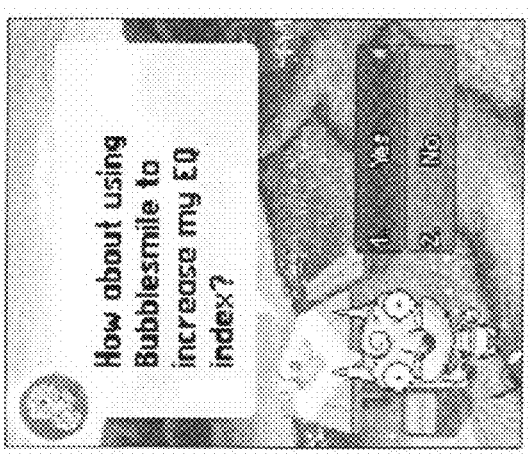
FIG. 24A-24C are a view of an avatar recommending a user to use a recommended program according to the in-use state of a phone in FIGS. 16 and 17.
Figure 24B:
Figure 24C:

FIGS. 24A-24C represent an avatar which informs a user of using a corresponding recommended program, when a timer event of ID 1 is generated in FIG. 16 or in Step 1704 of FIG. 17. If the timer event of ID 1 is generated, due to the phone use frequency being lower than a threshold value, as shown in FIG. 24A, an avatar is displayed and a text recommending the use of the corresponding recommended program is displayed. Then, if "1. Yes" is selected, as shown in FIG. 24B, the avatar displays a text informing the user of it, with a glad expression. Further, if a predetermined time period elapses or key input is performed for a predetermined key, the avatar disappears and the mode of the portable terminal is converted to a mode in which the corresponding recommended program can be performed. However, if "2. No" is selected, as shown in FIG. 24C, the avatar displays a text informing a user of it, with a sorrowful expression. Further, if a predetermined time period elapses or key input is performed for a predetermined key, the avatar disappears.

The system-related event processing operations of the portable terminals according to the exemplary embodiments of the present invention can be performed as mentioned above. On the other hand, while the invention has been shown and described with reference to certain exemplary embodiments thereof, it will be understood by those skilled in the art that various changes in form and details may be made therein without departing from the spirit and scope of the invention as defined by the appended claims.

Therefore, according to the exemplary embodiments of the present invention, the system-related events can be expressed through the character agent function, by adding the character agent function to the portable terminal or by using the control unit of the portable terminal, thereby expressing the generation and processing of the events generated in the portable terminal with the avatar UIs and expressing the system-related events with the character agent function.

What is claimed is:

1. A device for processing system-related events in a portable terminal, the device comprising:

a memory for storing a character User Interface (UI) image according to a system-related event;

an event collection section for detecting the system-related event generated in the portable terminal and for generating an event message for discriminating the generated system-related event;

an agent control section comprising a plurality of specialists for processing system-related events, the agent control section determining a specialist of the plurality of specialists corresponding to the system-related event, calling the determined specialist to process the system-related event, and selecting and outputting a character UI Identification (ID) corresponding to the system-related event;

an agent expression section for accessing and outputting at least one of a character image and a text corresponding to the character-UI ID according to the system-related event; and a supervision section for selecting a specialist that is most relevant to the received event, if more than two specialists are selected with respect to one event.

2. The device according to claim 1, wherein the agent control section comprises:

a specialist which confirms whether a state of a battery is fully charged and informs a user that the battery is fully charged if the battery is determined to be fully charged; and a specialist which confirms whether the battery power is less than a threshold value and informs a user that the residual amount of the battery power is low if the battery power is less than the threshold value.

3. The device according to claim 1, wherein the agent control section comprises a specialist which confirms whether a signal strength is less than a threshold value, and informs a user that the signal is weak by selecting and outputting a corresponding character-UI ID if the signal strength is determined to be less than the threshold value.

4. The device according to claim 1, wherein the agent control section comprises a specialist which confirms whether an available memory capacity is less than a threshold value and informs a user that the available memory capacity is low if the memory capacity is less than the threshold value.

5. The device according to claim 1, wherein the agent control section comprises a specialist which confirms whether a bell sound changing day exceeds a threshold day and informs a user to change the bell sound if the bell sound changing day exceeds the threshold day.

6. The device according to claim 1, wherein the agent control section comprises a specialist which confirms whether a background changing day exceeds a threshold day and informs a user to change the background if the background changing day exceeds the threshold day.

7. The device according to claim 1, wherein the agent control section comprises a specialist which sets a timer when a bell mode has been changed at more than a threshold number of times within a threshold time range and informs a user to change the bell mode if the timer event is generated.

8. The device according to claim 1, wherein the agent control section comprises a specialist which confirms whether a phone use frequency is lower than a threshold value and informs a user to use a corresponding recommended program if the phone use frequency is lower than the threshold value.

9. The device according to claim 1, wherein the memory stores at least one of a character UI image informing a user that the battery is fully charged, a character UI image informing a user that the residual amount of the battery power is low, a character UI image informing a user that the signal strength is weak, a character UI image informing a user that the available memory capacity is low, a character UI image informing a user to change the bell sound, a character UI image informing a user to change the background, a character UI image informing a user to change the bell mode if it reaches a threshold time range, and a character UI image informing a user to use a corresponding recommended program if the phone use frequency is low.

10. A method for processing system-related events in a portable terminal, the method comprising the steps of:
    storing system-related events generated in the portable terminal;
    determining specialists corresponding to the system-related events among a plurality of specialists;
    selecting a specialist that is most relevant to the received event, if more than two specialists are selected with respect to one event;
    calling the determined specialists to process the system-related events and generate processing results; and
    displaying the processing results with at least one of a text and an avatar according to the system-related events.

11. The method according to claim 10, wherein the system-related events comprise at least one of a battery state changing event, a signal state changing event, an available memory capacity changing event, a bell mode changing event, and a timer event set by a specialist performing the system-related operations.

12. The method according to claim 11, wherein, of first and second specialists which process the battery state changing events, the first specialist confirms whether the battery is fully charged and displays a text/avatar informing a user that the battery is fully charged if the battery is determined to be fully charged, by the first specialist, and the second specialist confirms whether the residual amount of the battery power is less than a threshold value and displays at least one of a text and an avatar informing a user that the residual amount of battery power is low if the residual amount of battery power determined to be less than the threshold value by the second specialist.

13. The method according to claim 11, wherein a third specialist processing the wave state changing event confirms whether the signal strength is less than a threshold value and displays at least one of a text and an avatar informing a user that the signal strength is weak if the signal strength is determined to be less than the threshold value by the third specialist.

14. The method according to claim 11, wherein a fourth specialist processing the available memory capacity changing event confirms whether the memory capacity is less than a threshold value and displays at least one of a text and an avatar informing a user that the available memory capacity is low if the memory capacity is determined to be less than the threshold value by the fourth specialist.

15. The method according to claim 11, wherein a fifth specialist processing a fifth timer event of the timer events set by the specialists performing the system-related operations resets the fifth timer event, confirms whether the bell sound changing day exceeds a threshold day, and displays at least one of a text and an avatar recommending a user to change the bell sound if the bell sound changing day is determined to exceed the threshold day by the fifth specialist.

16. The method according to claim 11, wherein a sixth specialist processing a sixth timer event of the timer events set by the specialists performing the system-related operations resets the sixth timer event, confirms whether the background changing day exceeds a threshold day, and displays at least one of a text and an avatar recommending a user to change the background if the background changing day is determined to exceed the threshold day by the sixth specialist.

17. The method according to claim 11, wherein a seventh specialist processing the bell mode changing event confirms whether the bell mode has been changed at more than a threshold number of times in a threshold time range and sets the timer, and displays at least one of a text and an avatar recommending the change of the bell mode if the timer set by the seventh specialist is generated.

18. The method according to claim 11, wherein a eighth specialist processing a eighth timer event of the timer events set by the specialists performing the system-related operations, resets the eighth timer event, confirms a recommended application program item preset per the lowest item of the phone use frequency and the avatar state value and the lowest item of the avatar state value, and displays at least one of a text and an avatar recommending use of the recommended application program preset per the lowest item of the avatar state value in the case in which the phone use frequency is determined to be less than a threshold value by the eighth specialist.

19. The method according to claim 10, wherein the step of processing the system-related events comprises:
    checking a battery state of the portable terminal;
    displaying at least one of a text and an avatar informing a user that the battery of the portable terminal is fully charged if the battery of the portable terminal is fully charged; and
    displaying at least one of a text and an avatar informing a user that the residual amount of the battery is low if the residual amount of the battery is less than a threshold value.

20. The method according to claim 10, wherein the step of processing the system-related events comprises:
    checking a signal state of the portable terminal; and
    displaying at least one of a text and an avatar informing a user that a signal received by the portable terminal is weak if the intensity of a signal received by the portable terminal is less than a threshold value.

21. The method according to claim 10, wherein the step of processing the system-related events comprises:
    checking an available memory capacity of the portable terminal; and
    displaying a text/avatar informing a user that the available memory capacity of the portable terminal is low if the memory capacity of the portable terminal is less than a threshold value.

22. The method according to claim 10, wherein the step of processing the system-related events comprises:
    checking a bell sound changing day by a threshold period; and
    displaying at least one of a text and an avatar recommending a change of the bell sound if the bell sound changing day exceeds a threshold day.

23. The method according to claim 22, further comprising the step of converting the mode of the portable terminal to a bell sound changing mode, if the change of the bell sound is selected.

24. The method according to claim 10, wherein the step of processing the system-related events comprises:
    checking a background changing day by a threshold period; and
    displaying at least one of a text and an avatar recommending a change of the background if the background changing day exceeds a threshold day.

25. The method according to claim 24, further comprising the step of:
   converting the mode of the portable terminal to a background changing mode, if the change of the background is selected.

26. The method according to claim 10, wherein the step of processing the system-related events comprises:
   determining whether a bell mode change has been performed at more than a threshold number of times within a threshold time range, if the bell mode change is performed in the portable terminal;
   setting a bell mode changing timer, if the bell mode change has been performed at more than a threshold number of times within a threshold time range;
   determining whether the bell mode change is performed within the threshold time range, if the bell mode changing timer is set; and
   displaying a text/avatar recommending a change of the bell mode, if the bell mode change is performed within the threshold time range.

27. The method according to claim 26, further comprising the step of:
   converting the mode of the portable terminal to a mode in which the bell mode change is performed, if the bell mode change is selected.

28. The method according to claim 26, wherein the threshold time range is from a first threshold time earlier than the time at which the bell mode was changed to the time at which the bell mode was changed, or from the time at which the bell mode was changed to a second threshold time later than the time at which the bell mode was changed.

29. The method according to claim 28, wherein the threshold time range is from the first threshold time to the second threshold time.

30. The method for processing system-related events in a portable terminal according to claim 10, the method comprising the steps of:
   checking the phone use frequency by a threshold period in the portable terminal; and
   displaying at least one of a text and an avatar recommending use of a corresponding recommended program, if the phone use frequency is lower than a threshold value.

31. The method according to claim 30, further comprising the step of:
   converting the mode of the portable terminal to a mode in which the corresponding recommended program is performed, if the corresponding recommended program is selected.

* * * * *